US012684156B2

(12) United States Patent
Newman et al.

(10) Patent No.:    US 12,684,156 B2
(45) Date of Patent:        Jul. 14, 2026

(54) REDUCING NETWORK BANDWIDTH CONSUMPTION USING GENERICALLY ENCODED MEDIA OBJECTS

(71) Applicant: VIASAT, INC., Carlsbad, CA (US)

(72) Inventors: Daniel M. Newman, Littleton, MA (US); Mark D. Dankberg, Encinitas, CA (US)

(73) Assignee: VIASAT, INC., Carlsbad, CA (US)

( * ) Notice:    Subject to any disclaimer, the term of this patent is extended or adjusted under 35 U.S.C. 154(b) by 0 days.

(21) Appl. No.: 18/640,842

(22) Filed:    Apr. 19, 2024

(65)            Prior Publication Data

US 2024/0340434 A1        Oct. 10, 2024

Related U.S. Application Data

(63) Continuation    of    application    No. PCT/US2022/046481, filed on Oct. 12, 2022.

(Continued)

(51) Int. Cl.
H04N 7/10            (2006.01)
G06F 21/62            (2013.01)
(Continued)

(52) U.S. Cl.
CPC ....... H04N 19/463 (2014.11); G06F 21/6209 (2013.01); H04N 21/23106 (2013.01)

(58) Field of Classification Search
CPC ....... H04N 21/23106; H04N 21/23418; H04N 21/2665; H04N 21/4331; H04N 21/6581;
(Continued)

(56)            References Cited

U.S. PATENT DOCUMENTS 6,564,380 B1 *    5/2003    Murphy ................. H04N 7/147
                                                          725/86
7,219,127 B2 *    5/2007    Huck ..................... G06Q 10/10
                                                          709/204
(Continued)

FOREIGN PATENT DOCUMENTS

WO        2007028245 A1        3/2007
WO        2010083214 A2        7/2010

OTHER PUBLICATIONS

International Search Report and Written Opinion, for PCT/US2022/046481, dated Jan. 31, 2023, in 16 pages.
(Continued)

*Primary Examiner* — Philip P. Dang
(74) *Attorney, Agent, or Firm* — Chang & Hale LLP

(57)            ABSTRACT

Described herein are ways to advantageously reduce bandwidth use between an internet service provider and its subscribers by re-encoding media objects to have a generic encoding that can be cached at subscriber devices. When a subscriber makes an authorized request for a media object from a content provider, a cached version of the generically encoded media object may be played by the subscriber even if the subscriber is not a customer of the content provider that originally provided the media object. This can eliminate the need for streaming a new copy of the media object from the content provider. The disclosed systems are configured to identify when differently-encoded media objects represent the same media object so that subscribers can play cached media objects rather than requiring each media object be streamed from different content providers.

21 Claims, 18 Drawing Sheets

Related U.S. Application Data

(60) Provisional application No. 63/257,547, filed on Oct. 19, 2021.

(51) Int. Cl.
 *H04N 19/463* (2014.01)
 *H04N 21/231* (2011.01)
 *H04N 21/25* (2011.01)

(58) Field of Classification Search
 CPC ............ H04N 21/25875; H04N 19/463; G06F 21/6209
 See application file for complete search history.

(56) References Cited

U.S. PATENT DOCUMENTS

| | | | | |
|---|---|---|---|---|
| 7,633,887 | B2 * | 12/2009 | Panwar | H04L 67/1085 |
| | | | | 370/254 |
| 7,719,995 | B2 * | 5/2010 | Luft | H04L 67/566 |
| | | | | 709/219 |
| 9,075,560 | B2 * | 7/2015 | Sankuratri | H04N 19/172 |
| 9,123,084 | B2 * | 9/2015 | Brockmann | G06T 9/00 |
| 9,146,884 | B2 * | 9/2015 | Kumar | G06F 9/45533 |
| 9,235,452 | B2 * | 1/2016 | Abdo | G06T 1/00 |
| 9,332,287 | B2 * | 5/2016 | Matuchniak | H04L 65/1089 |
| 9,538,249 | B2 * | 1/2017 | Dankberg | H04N 21/4784 |
| 9,614,780 | B2 * | 4/2017 | Newman | H04L 47/19 |
| 9,742,736 | B2 * | 8/2017 | Conus | H04N 21/222 |
| 9,866,889 | B2 * | 1/2018 | Tirpak | H04N 21/41407 |
| 10,367,870 | B2 * | 7/2019 | Pevzner | H04N 7/147 |
| 10,546,139 | B2 * | 1/2020 | Ellingson | G06F 16/178 |
| 10,547,885 | B2 * | 1/2020 | Hasek | H04N 21/23439 |
| 10,666,701 | B2 * | 5/2020 | Kagan | H04L 65/70 |
| 11,117,054 | B2 * | 9/2021 | Kojima | A63F 13/35 |
| 11,212,234 | B2 * | 12/2021 | Dankberg | H04L 47/56 |
| 11,916,990 | B2 * | 2/2024 | Sebastian | H04L 45/7453 |
| 2004/0181579 | A1 | 9/2004 | Huck et al. | |
| 2006/0120385 | A1 * | 6/2006 | Atchison | H04N 21/2743 |
| | | | | 348/E7.071 |
| 2006/0179468 | A1 * | 8/2006 | Pearson | H04N 21/47 |
| | | | | 348/E7.071 |
| 2009/0204964 | A1 | 8/2009 | Foley et al. | |
| 2010/0179984 | A1 * | 7/2010 | Sebastian | H04L 69/22 |
| | | | | 709/203 |
| 2010/0226441 | A1 * | 9/2010 | Tung | H04N 19/436 |
| | | | | 375/E7.126 |
| 2011/0185168 | A1 * | 7/2011 | Schlacht | H04N 21/6143 |
| | | | | 713/150 |
| 2013/0117379 | A1 * | 5/2013 | Kahn | H04N 21/4405 |
| | | | | 709/205 |
| 2013/0272394 | A1 | 10/2013 | Brockmann et al. | |
| 2015/0089014 | A1 | 3/2015 | Niemeijer | |
| 2022/0210499 | A1 * | 6/2022 | Sarosi | H04N 21/2387 |
| 2023/0359607 | A1 * | 11/2023 | Kuhnke | H04N 21/2225 |
| 2024/0235833 | A1 * | 7/2024 | del Valle Diharce | |
| | | | | H04L 9/0894 |
| 2024/0340434 | A1 * | 10/2024 | Newman | H04N 21/2665 |
| 2024/0388752 | A1 * | 11/2024 | Newman | H04N 21/2187 |

OTHER PUBLICATIONS

Mikityuk et al., "The Virtual Set-Top Box: On the shift of IPTV Service Execution, Service & UI Composition into the Cloud," 2013 17th International Conference on Intelligence in Next Generation Networks (ICIN), 2013, in 8 pages.

* cited by examiner

1

REDUCING NETWORK BANDWIDTH CONSUMPTION USING GENERICALLY ENCODED MEDIA OBJECTS

CROSS-REFERENCE TO RELATED APPLICATIONS

This application is a continuation of PCT App. No. PCT/US2022/046481 filed Oct. 12, 2022 and entitled "REDUCING NETWORK BANDWIDTH CONSUMP- TION USING GENERICALLY ENCODED MEDIA OBJECTS," which claims priority to U.S. Prov. Pat. App. No. 63/257,547 filed Oct. 19, 2021, each of which is incorporated by reference herein in its entirety for all pur- poses.

BACKGROUND

Field

The present disclosure generally relates to reducing net- work bandwidth consumption using generically encoded media objects.

Description of Related Art

Network bandwidth is a limited resource and is suscep- tible to congestion when too many networked devices com- municate too much data at the same time. Different tech- niques exist to manage bandwidth usage in a network, such as by throttling network usage or imposing quality of service constraints on different types of network traffic.

SUMMARY

According to a number of implementations, the present disclosure relates to a system that includes a network interface, a non-transitory computer-readable medium, and a processor communicatively coupled to the communications interface and the non-transitory computer-readable medium. The non-transitory computer-readable medium includes pro- cessor-executable instructions configured to cause the pro- cessor to receive a request from a first subscriber for a media object from a first content provider; authorize access to the media object from the first content provider using creden- tials corresponding to the first subscriber; request the media object from the first content provider; generically encode the media object to generate a first generically encoded media object by encoding rendered frames of the media object from video memory; transmit the first generically encoded media object to the first subscriber; and transmit the first generically encoded media object to a second subscriber for storing in cache based on a determination that the second subscriber is likely to order the media object from a second content provider.

In some embodiments, the processor-executable instruc- tions further cause the processor to receive a request from the second subscriber for the media object from the second content provider. In further embodiments, the processor- executable instructions further cause the processor to autho- rize access to the media object from the second content provider using credentials corresponding to the second sub- scriber. In further embodiments, the processor-executable instructions further cause the processor to request the media object from the second content provider. In further embodi- ments, the processor-executable instructions further cause the processor to generically encode the media object to generate a second generically encoded media object by encoding rendered frames of the media object from video memory. In further embodiments, the processor-executable instructions further cause the processor to compare the first generically encoded media object to the second generically encoded media object to determine if they are identical media objects. In further embodiments, the processor-ex- ecutable instructions further cause the processor to instruct the second subscriber to play the first generically encoded media object from cache responsive to determining that the first generically encoded media object and the second generically encoded media objects are identical media objects. In some further embodiments, the processor-execut- able instructions further cause the processor to transmit the second generically encoded media object to the second subscriber responsive to determining that the first generi- cally encoded media object and the second generically encoded media objects are not identical media objects. In some further embodiments, determining that the first generi- cally encoded media object and the second generically encoded media object are identical media objects comprises comparing metadata of the first generically encoded media object to the second generically encoded media object. In some further embodiments, determining that the first generi- cally encoded media object and the second generically encoded media object are identical media objects comprises comparing fingerprints of chunks of each media object.

In some embodiments, the processor-executable instruc- tions further cause the processor to initiate a virtual screen session for rendering the media object from the first content provider. In some embodiments, the processor-executable instructions further cause the processor to send information regarding interactions of the first subscriber with a website or application of the first content provider. In further embodiments, the processor-executable instructions further cause the processor to generate an interface that mimics the website or application of the first content provider, the first subscriber interacting with the generated interface.

According to a number of implementations, the present disclosure relates to a method for reducing bandwidth con- sumption. The method includes receiving a request from a first subscriber for a media object from a first content provider. The method also includes authorizing access to the media object from the first content provider using creden- tials corresponding to the first subscriber. The method also includes. The method also includes requesting the media object from the first content provider. The method also includes generically encoding the media object to generate a first generically encoded media object by encoding ren- dered frames of the media object. The method also includes transmitting the first generically encoded media object to the first subscriber. The method also includes transmitting the first generically encoded media object to a second subscriber for storing in cache based on a determination that the second subscriber is likely to order the media object from a second content provider. The method also includes receiving a request from the second subscriber for the media object from the second content provider. The method also includes authorizing access to the media object from the second content provider using credentials corresponding to the second subscriber. The method also includes requesting the media object from the second content provider. The method also includes generically encoding the media object to generate a second generically encoded media object by encoding rendered frames of the media object. The method also includes comparing the first generically encoded media object to the second generically encoded media object to determine if they are identical media objects. The method also includes instructing the second subscriber to play the first generically encoded media object from cache responsive to determining that the first generically encoded media object and the second generically encoded media objects are identical media objects. The method also includes transmitting the second generically encoded media object to the second subscriber responsive to determining that the first generically encoded media object and the second generically encoded media objects are not identical media objects.

In some embodiments, determining that the first generically encoded media object and the second generically encoded media object are identical media objects comprises comparing metadata of the first generically encoded media object to the second generically encoded media object. In some embodiments, determining that the first generically encoded media object and the second generically encoded media object are identical media objects comprises comparing fingerprints of chunks of each media object. In some embodiments, the method further includes initiating a virtual screen session for rendering the media object from the first content provider.

In some embodiments, the method further includes sending information regarding interactions of the first subscriber with a website or application of the first content provider. In further embodiments, the method further includes generating an interface that mimics the website or application of the first content provider, the first subscriber interacting with the generated interface.

In some embodiments, the method further includes identifying chunks of the second generically encoded media object that do not have a sufficiently similar fingerprint to the first generically encoded media object and storing the identified chunks as an advertisement in a cache. In some embodiments, the media object is received from the first content provider in a first encoding and from the second content provider in a second encoding different from the first encoding.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

Figure 1A:
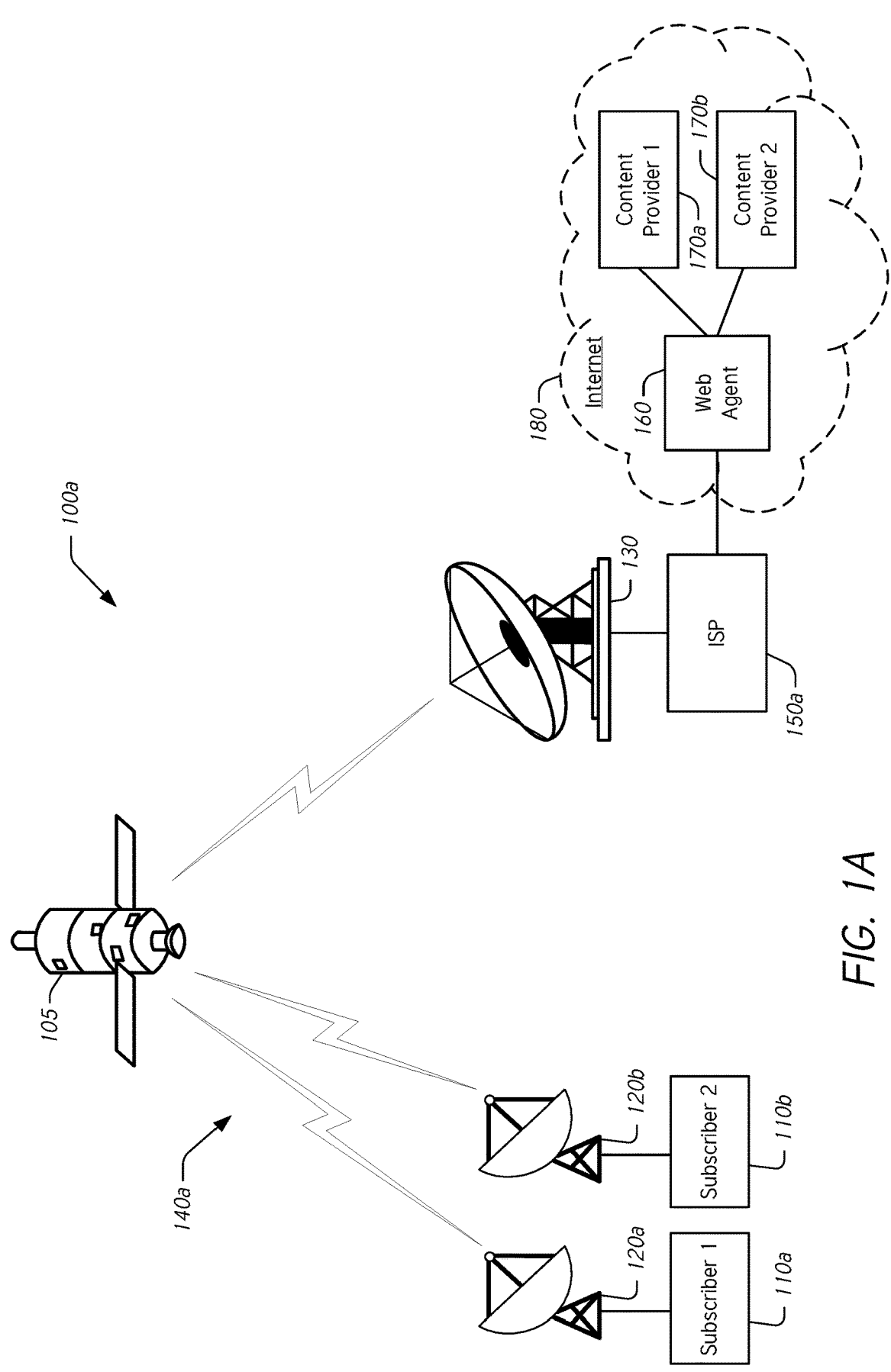
FIGS. 1A and 1B illustrate example network environments with a web agent configured to generically encode media objects to reduce network consumption.

The headings provided herein, if any, are for convenience only and do not necessarily affect the scope or meaning of the claimed invention.

Overview

Internet service providers (each an "ISP") provide access to the Internet via a communications medium, such as over co-axial cable, fiber optic cable, via radio frequency ("RF") communications, such as satellite or cellular, etc. An ISP's subscribers will use equipment, such as a cable modem or a satellite transceiver and dish, to send and receive data and, thereby, access the Internet. Many subscribers may use their Internet connection to view video content, such as movies or TV shows, provided by one or more content providers (e.g., NETFLIX®, HULU®, AMAZON®, TUBI®, etc.). For example, a subscriber accesses a desired content provider, provides login information, and then selects a title to watch. In response, the content provider transmits the corresponding media object to the subscriber. In some cases, the media object is "streamed" to the subscriber meaning that media object data is transmitted at a rate that enables the subscriber to begin watching the selected media immediately and to receive the media object data fast enough that playback is not interrupted while more media object data is received.

For popular movies or TV shows, many different subscribers may request to stream the same content from different content providers over the course of a few hours, days, or weeks (or longer). For example, new movies or new seasons of TV shows may be streamed by hundreds or thousands of people over the course of a few hours after they are released. This consumes a significant amount of the ISP's bandwidth as each individual stream traverses the ISP's network to arrive at a subscriber's device, e.g., a television or computer. In addition, for a given title (e.g., movie or episode of a TV show) the content being streamed to each subscriber is essentially identical, even if it is being streamed from different content providers at different times by different people. Thus, providing subscribers the ability to watch a movie or TV show at a time of their choosing typically results in the content provider and the ISP separately streaming the content to each individual customer, consuming network bandwidth resources.

This scenario represents a shortcoming in typical media delivery systems. Attempts to reduce or minimize use of the bandwidth of a satellite or other bandwidth-limited communications link, a service provider (e.g., an ISP) may multicast a single instance of the same media object to multiple subscribers. For example, when one subscriber orders a media object (e.g., a movie or an episode of a TV show), the ISP may determine that one or more non-ordering subscribers on the same communications link is likely to order the same media object at some point in the future. In response to this determination, the ISP may then multicast the media object to the ordering subscriber and to one or more of the non-ordering subscribers. The ordering subscriber plays the media object, and the one or more non-ordering subscribers cache the media object. If a non-ordering subscriber later orders the media object, it can be played from its cache rather than receiving it from the content provider, thereby reducing bandwidth consumption.

However, different content providers may encode the same media object differently. The result is that the same media object originating from different content providers appears to be and is treated as different media objects. For this reason, encoded media objects from different content providers may not be advantageously multicast to non-ordering subscribers even though the media objects provide the same content (e.g., the same movie or episode of a TV show).

Accordingly, to address these and other issues, described herein are systems, methods, and devices that advantageously reduce bandwidth use between the ISP and its subscribers by re-encoding media objects to have a generic encoding that can be cached at subscriber devices. Consequently, when a subscriber makes an authorized request for a media object from a content provider, a cached version of the generically encoded media object may be played by the subscriber even if the subscriber is not a customer of the content provider that originally provided the media object. This can eliminate the need for streaming a new copy of the media object from the content provider. The disclosed systems and methods are configured to identify when differently-encoded media objects represent the same media object so that subscribers can play cached media objects rather than requiring each media object be streamed from different content providers.

The disclosed systems provide the described advantages using a web agent (e.g., a cloud agent). By way of example, a first subscriber orders a media object from a first content provider. The web agent determines that the first subscriber is authorized to access the requested media object and, in response, retrieves the media object from the first content provider. The web agent streams the media object from the first content provider and creates a generic encoding of the media object. The generically encoded media object is multicast to the first subscriber and to a second, non-ordering subscriber, responsive to determining that the second subscriber is likely to order the same media object at a later time. When the second subscriber orders the media object from a second content provider, the web agent determines that the second subscriber is authorized to access the requested media object and instructs the second subscriber to play the generically encoded media object from its cache.

The disclosed systems and methods may be particularly advantageous for subscribers of a satellite-based ISP that are located within a geographic region served by a particular satellite because these subscribers may all be capable of receiving the content being broadcast by that satellite at any given time. Thus, if one subscriber begins watching an episode of a popular TV series, the ISP's satellite can multicast the generically encoded media object to multiple non-ordering subscribers, making the media object readily available for these subscribers in the geographic region regardless of which content provider they may use to access the media object. If a non-ordering subscriber later orders the media object, from the same content provider or a different content provider, the ISP can instruct the subscriber's equipment to play the generically encoded media object from its data storage or cache. The ISP does not need to retransmit the media object to the ordering subscriber, thereby reducing bandwidth consumption over the satellite network.

Similar advantages arise in implementations that provide satellite network service to vehicles, such as aircraft. For example, a satellite transceiver onboard an airplane may receive and cache generically encoded media objects, as described herein, and may individually stream the generically encoded media objects to individual travelers on the aircraft even where the individuals access the media objects using different content providers.

Example Network Environments

FIG. 1A illustrates a diagram of an example network environment 100a that includes a web agent 160 to generically encode media objects to reduce network bandwidth consumption. The network environment 100a includes a satellite network 140a that communicatively couples subscribers 110a, 110b and an ISP 150a to one another and to a network (such as the Internet 180). The subscribers 110a, 110b can be at a fixed location or in a mobile vehicle such as an airplane, boat, car, bus, train, etc. The network environment 100a may utilize various network architectures that include space and ground segments. For example, the space segment may include one or more satellites, while the ground segment may include one or more satellite user terminals, gateway terminals, network operations centers (NOCs), satellite and gateway terminal command centers, and/or the like. Some of these elements are not shown in the figure for clarity. In some embodiments, the satellite network 140a can include a geosynchronous earth orbit (GEO) satellite or satellites, a medium earth orbit (MEO) satellite or satellites, and/or a low earth orbit (LEO) satellite or satellites. In some embodiments, the satellite 105 is a satellite network with a plurality of satellites. In some embodiments, the satellite 105 can include a geosynchronous earth orbit (GEO) satellite or satellites, a medium earth orbit (MEO) satellite or satellites, and/or a low earth orbit (LEO) satellite or satellites. In some embodiments, as described herein, the access network can be any suitable network including an entirely terrestrial-based network.

The satellite network 140a includes a forward link for sending information from the ISP 150a to subscribers 110a, 110b, and a return link for sending information from the subscribers 110a, 110b to the ISP 150a. The forward link includes a transmission path from the ISP 150a through a gateway satellite transceiver 130, through a satellite 105 via a satellite uplink channel, to the subscriber satellite transceivers 120a, 120b via a satellite downlink channel, and to the subscribers 110a, 110b. The return link includes a transmission path from the subscriber satellite transceivers 120a, 120b to the satellite 105 via the satellite uplink channel, to the gateway satellite transceiver 130 via the satellite downlink channel, and to the ISP 150a. Each transmission channel may utilize multiple satellites and transceivers.

The subscribers 110a, 110b are configured to transmit data to the ISP 150a through the satellite network 140a via the return link. After reaching the ISP 150a, the data can then be directed to the Internet 180. Data from the Internet 180 can be sent to the subscribers 110a, 110b by the ISP 150a via the forward link of the satellite network 140a. The subscribers 110a, 110b include devices such as customer premises equipment (CPE), routers, computers, and the like that enable users to access and interact with a network (e.g., the Internet 180). In some embodiments, the subscribers 110a, 110b are within a single spot beam of the satellite 105.

The ISP 150*a* provides a subscription-based service connecting subscribers 110*a*, 110*b* to the network 180 (e.g., the Internet) via the satellite network 140*a*. The ISP 150*a* includes network management systems to manage network traffic flow to individual subscribers 110*a*, 110*b* sharing the satellite network link 140*a*. The ISP 150*a* may include a hub or ground station. In certain embodiments, the ISP 150*a* is configured or designed to service forward uplink signals to a satellite 105, and to return downlink signals from the satellite 105. The ISP 150*a* can include a service provider gateway or service provider system that manages data across the satellite network 140*a*, including scheduling network traffic and interacting with the subscribers 110*a*, 110*b*.

The ISP 150*a* may also provide an interface between the Internet 180 and the satellite 105 and/or another network. The ISP 150*a* may receive data and information from the Internet 180 that includes content from content providers 170*a*, 170*b* that is directed to the subscribers 110*a*, 110*b*. The ISP 150*a* may format data and information for delivery to the subscribers 110*a*, 110*b* via the satellite 105 and the ISP 150*a* may also interact with the subscribers 110*a*, 110*b* to provide instructions or other information. The ISP 150*a* may also receive signals carrying data and information from the satellite 105. This data and information may be transmitted by the subscribers 110*a*, 110*b* and directed to destinations accessible via the Internet 180. The ISP 150*a* may format this data and information for delivery via the Internet 180. The Internet 180 may connect the ISP 150*a* with other gateway routing devices that may be in communication with the satellite 105 or with other satellites. In some embodiments, part or all of the ISP 150 can be located in a virtual device residing in a public or private computing cloud.

The web agent 160 can be implemented in whole or in part on the Internet or in whole or in part in a service provider system. The web agent 160 can be configured to specifically interact with the subscribers 110*a*, 110*b* and content providers 170*a*, 170*b* via the ISP 150*a*. The web agent 160 does this to improve network bandwidth consumption by generically encoding media objects from the content providers 170*a*, 170*b* for delivery to the subscribers 110*a*, 110*b*. The web agent 160 can be configured to stream media objects from the content providers 170*a*, 170*b* within the web agent 160 itself and use these streams to generate generically encoded media objects. As used herein, the terms "generically encoded" or "generic encoding" may refer to any digital encoding of a digital file or digital data that is accessible to the subscribers 110*a*, 110*b* and does not necessarily refer to any particular encoding scheme. Thus, the term generic is used in a broad sense to differentiate it from proprietary encoding schemes that limit access to media objects to customers of specific content providers.

Although not illustrated, it is to be understood that the ISP 150*a* and the web agent 160 includes one or more processors configured to execute computer executable instructions that implement software modules and functions to generically encode media objects, to authorize and access media objects from content providers 170*a*, 170*b*, to determine similarities between media objects, and the like. The ISP 150*a* and the web agent 160 can each include one or more data storage devices or caches configured to store media objects, metadata associated with media objects, content-identifying (e.g., fingerprinting) data associated with media objects, subscriber credentials, and the like as well as computer executable instructions. Examples of suitable processors and data storage devices are provided elsewhere herein.

In some embodiments, content delivered in the forward link is beamed to each subscriber in a spot beam provided by the satellite 105. This applies to generically encoded media objects generated at the web agent 160. In such embodiments, it may be advantageous to control one or more of the subscribers within the spot beam to cache the generically encoded media object for potential streaming in the future. As described herein, this can reduce or improve network bandwidth utilization by reducing streaming of identical media objects over the satellite link 140*a* where the media objects principally differ due to different encoding schemes by different content providers.

For example, if a media object is something popular, like a newly released movie, each of the subscribers in the spot beam has the opportunity receive that content and store it for later access. Thus, in addition to sending the generically encoded media object to the ordering subscriber, the ISP 150*a* can be configured to multicast the generically encoded media object to non-ordering subscribers over the satellite network 140*a* for storage in a hard drive (e.g., the media object can be cached at the subscriber). At a later time (even seconds or minutes later), if a non-ordering subscriber decides to order the same content (even from a different content provider) the ISP 150*a* and web agent 160 can analyze the request to determine whether the requested content is already stored at the subscriber by comparing the requested content with content that has already been stored at the subscriber. Responsive to determining the subscriber has the media object in cache, the ISP 150*a* instructs the subscriber to play the media object from its cache rather than streaming it from the content provider. Thus, the ISP 150*a* conserves the satellite bandwidth that it otherwise would have used to re-transmit the content. For very popular titles that are watched by many subscribers over a relatively short time, e.g., hours or days, the ISP 150*a* can significantly reduce the number of total transmissions of that content. This can potentially reduce the impact to its subscriber-facing bandwidth, potentially improving responsiveness and available bandwidth for its subscribers for other functions.

Although the systems and methods described herein deal primarily with video content, such as television or movies, the disclosed systems and methods can be employed for other suitable data transmissions, such as for video games, software updates, etc., that may be relatively large (e.g., hundreds of megabytes ("MB") or gigabytes ("GB")) and may be used by significant numbers of customers. Further, while the illustrative example describes a "geographic region" in terms of physical geography due to its use of a wireless broadcast, some wired transmission media, such as cable-based or optical-based communications, employ broadcast-like transmission media and thus, an ISP employing one of these communications media may use these techniques in a multicast transmission to customers in a "logical" geographic region, e.g., customers within a particular IPv4 or IPv6 subnet, independent of their physical locations.

Figure 1B:
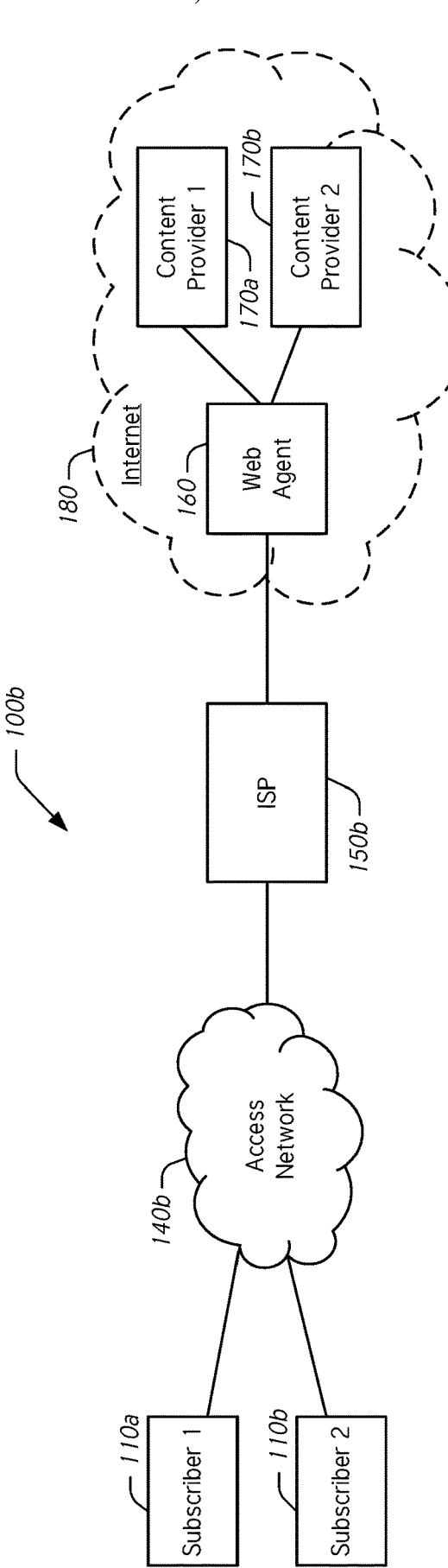

FIG. 1B illustrates an example network environment 100*b* that includes an access network 140*b* that couples the subscribers 110*a*, 110*b* to the ISP 150*b*. The network environment 100*b* is similar to the network environment 100*a* described herein with reference to FIG. 1A, wherein the access network 140*b* can be a terrestrial network, a satellite network, or a combination of a terrestrial network and a satellite network. The remaining components of the network environment 100*b* provide the same relevant functionality as those components of the network environment 100*a* described herein with reference to FIG. 1A with the understanding that communication between the subscribers 110*a*, 110*b* and the ISP 150*b* is provided using the access network 140*b*.

In various embodiments, the access network 140*b* may be any type of network and may include, for example, the Internet, an IP network, an intranet, a wide-area network (WAN), a local-area network (LAN), a virtual private network (VPN), a public switched telephone network (PSTN), a public land mobile network, a digital subscriber line (DSL), a cellular network, wireless local area network (WLAN) access point (AP) connected to DSL, or any combination of these. The access network 140*b* may be a hybrid network. A hybrid network can include a network with multiple parallel paths each having a different transport characteristic (e.g., a first path is a satellite, a second path is a DSL or cellular connection, etc.). In hybrid networks, traffic can be routed across the path whose transport characteristic is beneficial or most advantageous for that type of traffic.

The ISP 150*b* provides a subscription-based service connecting subscribers 110*a*, 110*b* to the target network 180 (e.g., the Internet). The ISP 150*b* includes network management systems configured manage network traffic flow to individual subscribers 110*a*, 110*b* coupled to the access network 140*b*. The ISP 150*b* may provide Internet access via cable, e.g., using RF frequencies transmitted over a co-axial wired connection, a cellular network via one or more cellular base stations, a fiber optic network, a TV or radio broadcast network, etc. The subscribers 110*a*, 110*b* may be grouped based on geography, network structures, subscription plans, network equipment, or the like.

As in the network environment 100*a*, the network environment 100*b* provides a web agent 160 that is configured to interface with content providers 170*a*, 170*b* on the Internet 180. The web agent streams requested and authorized media objects from the content providers 170*a*, 170*b* to generate generically encoded media objects for multicasting to subscribers connected to the network 180 through the access network 140*b*. The ISP 150*b* manages multicasting the generically encoded media objects, identifies identical media objects based on metadata and/or content-identifying (e.g., fingerprinting) techniques, and instructs subscribers on playing cached media objects in response to requests for content from content providers, as described in greater detail herein.

Figure 2A:
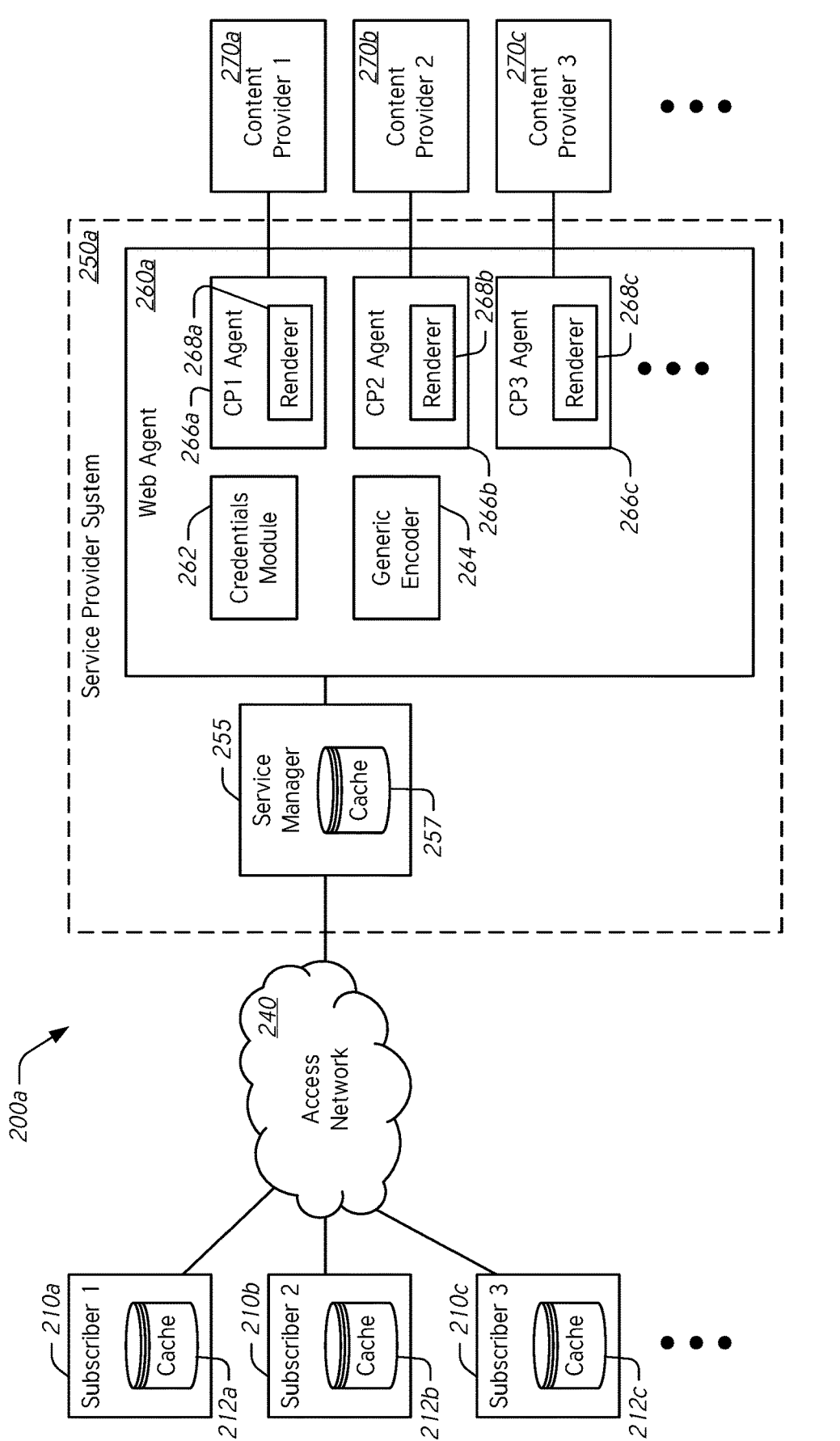
FIGS. 2A and 2B illustrate web agents for generically encoding media objects in example network environments.
Figure 2B:
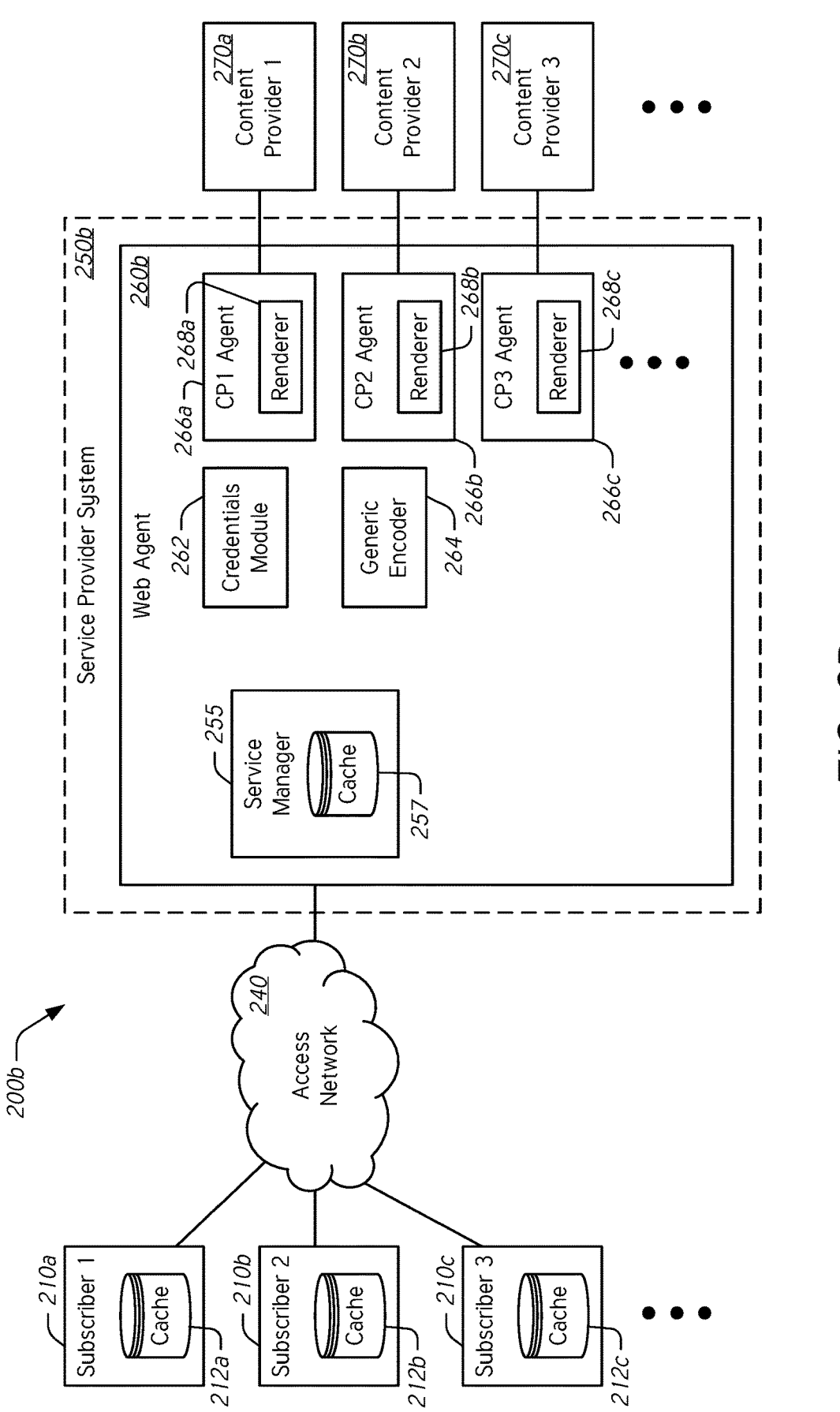

FIGS. 2A and 2B illustrate web agents 260*a*, 260*b* for generically encoding media objects in example network environments 200*a*, 200*b*. The network environments 200*a*, 200*b* can be any of the network environments described herein, such as the network environments 100*a*, 100*b* described herein with respect to FIGS. 1A and 1B, respectively. The network environments 200*a*, 200*b* include access network 240 that provides connectivity between subscribers 210*a*-210*c* and content providers 270*a*-270*c* through a service provider system 250*a*, 250*b* and a web agent 260*a*, 260*b*. The access network 240 can be any of the access networks described herein, such as the networks 140*a*, 140*b* described herein with reference to FIGS. 1A and 1B, respectively. The subscribers 210*a*-210*c* are similar to the subscribers 110*a*, 110*b* described herein with reference to FIGS. 1A and 1B. The subscribers 210*a*-210*c* include hardware, such as processors and memory, for performing the disclosed functions and processes, and in particular include respective caches 212*a*-212*c*, where caches include non-volatile and/or volatile memory and/or data storage devices. The caches 212*a*-212*c* can be configured to store generically encoded media objects generated by the web agent 260*a*, 260*b*. The content providers 270*a*-270*c* are similar to the content providers 170*a*, 170*b* described herein with reference to FIGS. 1A and 1B.

The network environments 200*a*, 200*b* each include a service provider system 250*a*, 250*b* similar to the ISP 150*a*, 150*b* described herein with respect to FIGS. 1A and 1B, respectively. The service provider systems 250*a*, 250*b* manage network communication on the access network 240, examples of which are provided herein. The service provider systems 250*a*, 250*b* include web agents 260*a*, 260*b* and a service manager 255. The web agents 260*a*, 260*b* provide the processes and functions described in greater detail elsewhere herein, such as interfacing with content providers 270*a*-270*c* and generating generically encoded media objects from authorized requests for media objects from the content providers 270*a*-270*c*. The service manager 255 is configured to provide media object comparison functionality, generation of content-identifying information (e.g., fingerprinting) of media objects, instructions to subscribers regarding storage and playback of generically encoded media objects, and the like as described in greater detail herein. The service manager 255 includes a cache 257 or data store configured to store metadata, media object content-identifying (e.g., fingerprint) information, generically encoded media objects, and the like. The cache 257 includes any suitable device or mechanism for storing information, including volatile and non-volatile memory and data storage devices. The network environment 200*a*, illustrated in FIG. 2A, implements the service manager 255 as part of the web agent 260*a*, whereas the network environment 200*b*, illustrated in FIG. 2B, implements the service manager 255 separately from the web agent 260*b*. Thus, it is to be understood that, with respect to the functionality described herein, the service provider system 250*a*, 250*b* can be implemented in a variety of ways but the functionality is not to be limited due to the particular configuration of the individual components or elements and that the disclosed methods and functionality can be achieved with a web agent implemented on the Internet (e.g., in a cloud environment), with a web agent implemented as part of the ISP's system for managing network traffic, and/or with a web agent implemented in a distributed computing environment with components of the web agent implemented in different places on the ISP's network.

The web agent 260*a*, 260*b* includes a credentials module 262, a generic encoder 264, and content provider agents 266*a*-266*c* corresponding to content providers 270*a*-270*c*. Each content provider agent (or CP agent) 266*a*-266*c* includes a renderer 268*a*-268*c* configured to render the media object through a virtual screen session or similar mechanism. The specific renderers 268*a*-268*c* are configured to render a media object to put it into video memory. This allows the generic encoder 264 to generically encode the media object, thereby removing any proprietary and/or specific encoding applied by the content provider and enabling access to any of the authorized subscribers 210*a*-210*c*. Description of these process is provided in greater detail herein with respect to FIGS. 3 and 6.

The renderers 268*a*-268*c* receive content downloaded by the CP agent and renders the content, e.g., by generating video frames and/or audio output. In some cases, the renderers 268*a*-268*c* may be integrated as a part the respective content provider agent 266*a*-266*c* or it may be separate. The output of the renderers 268*a*-268*c* is typically sent to memory in a display device, e.g., a video card or similar device, for use in displaying the content. This output may instead be diverted or sampled for use by the generic encoder 264.

The generic encoder 264 obtains rendered data from the renderers 268a-268c and encodes it for transmission to the one or more subscribers 210a-210c. The generic encoder 264 may apply encryption or DRM access controls to the rendered content to reduce the chance the content will be accessed by an unauthorized person. Any suitable encoding or DRM scheme may be used by the generic encoder 264. However, it should be appreciated that in some examples, a common encoding scheme is used for all content transmitted from the service provider system 250a, 250b to the downstream subscribers 210a-210c over the access network 240. This can help facilitate content recognition, discussed herein, as re-encoded content using the service provider's generic encoder 264 can be sampled, processed, and compared to previously identified re-encoded content without regard for differences in the various encoding schemes used by different content providers.

In some embodiments, the service provider system 250a, 250b (e.g., through the CP agents 266a-266c) is configured to provide a subscriber-facing interface that corresponds or mimics the content provider's interface, application, or website. This allows the subscribers 210a-210c to interact with an interface similar or identical to the content provider's interface while also allowing the CP agents 266a-266c to capture and pass on feedback to the respective content providers, the feedback including user actions, as described in greater detail herein.

The cache 257 stores a wide variety of information used by the service provider system 250a, 250b. The cache 257 stores information to help identify requested content, as described herein, to enable access to content providers, to track which content is stored at which subscriber device, etc. Such information may include fingerprint information for content; metadata or manifest information corresponding to previously requested content; user access information for one or more content providers, such as login names and passwords; cache information describing content that has been instructed by the service provider system 250a, 250b to be stored on one or more subscriber devices 210a-210c; etc.

Identification of content received from one or more content providers can be provided by the service manager 255. The service manager 255 may analyze metadata or manifest information; downsample or generate fingerprints for rendered content, such as audio or video frames; generate hash or similar information for received content; etc. Further, the service manager 255 may receive such information from the CP agents 266a-266c, from the generic encoder 264, or from the cache 257 (or any other suitable component of the service provider system 250a, 250b). In addition, the service manager 255 can analyze media objects sequentially (either before or after) or in parallel with encoding the content for transmission by the generic encoder 264. The service manager 255 may then output identification information for received content and may store or update such information within the cache 257.

A challenge addressed by the web agent 260a, 260b (e.g., using the CP agents 266a-266c) is that content providers 270a-270c typically protect their content using digital rights management ("DRM") encoding, which essentially encrypts the content. In addition, the DRM-encoded content is typically transmitted over an encrypted communications channel, e.g., a secure hypertext transfer protocol ("https") connection. Thus, the ISP itself is not able to access the content streamed to its users because it has been encrypted twice: using the DRM encoding and within the https connection. Thus, under ordinary circumstances, the ISP cannot identify what content a user has requested. To address this challenge, the web agent 260a, 260b uses the CP agents 266a-266c to request or order media objects from a content provider and subsequently accesses the content itself due to the CP agents 266a-266c being able to request, receive, and decode content from the content provider. The service manager 255 can then determine, based on rendering the decoded content, which content has been requested and, if appropriate, multicast the generically encoded media object as well as an instruction to its subscribers to cache the multicast media object.

The subscribers 210a-210c then execute the service provider's client software, which can emulate content providers' software clients. Thus, when a user uses the service provider's custom software client, it appears to the user that they are interacting with one of their content provider's software clients. The user can then provide commands or information, e.g., access credentials, for the content provider, which are transmitted to the service provider system 250a, 250b. After which, the user can navigate a user interface of the content provider's software client and select content. The user's actions can be passed to the content providers as feedback to enable a pass-through for user actions between the service provider's client software and the content provider's interface.

Examples of Encoding Media Objects

FIGS. 3A, 3B, 3C, 3D, 3E, 3F, 3G, and 3H illustrate steps in a process for providing a generically encoded media object to multiple subscribers that subscribe to different content providers. The network environment 200 corresponds to the network environment 200a described herein with reference to FIG. 2A and includes the other components described with respect to FIG. 2A, thus the components will not be described here again for the sake of conciseness.

Figure 3A:
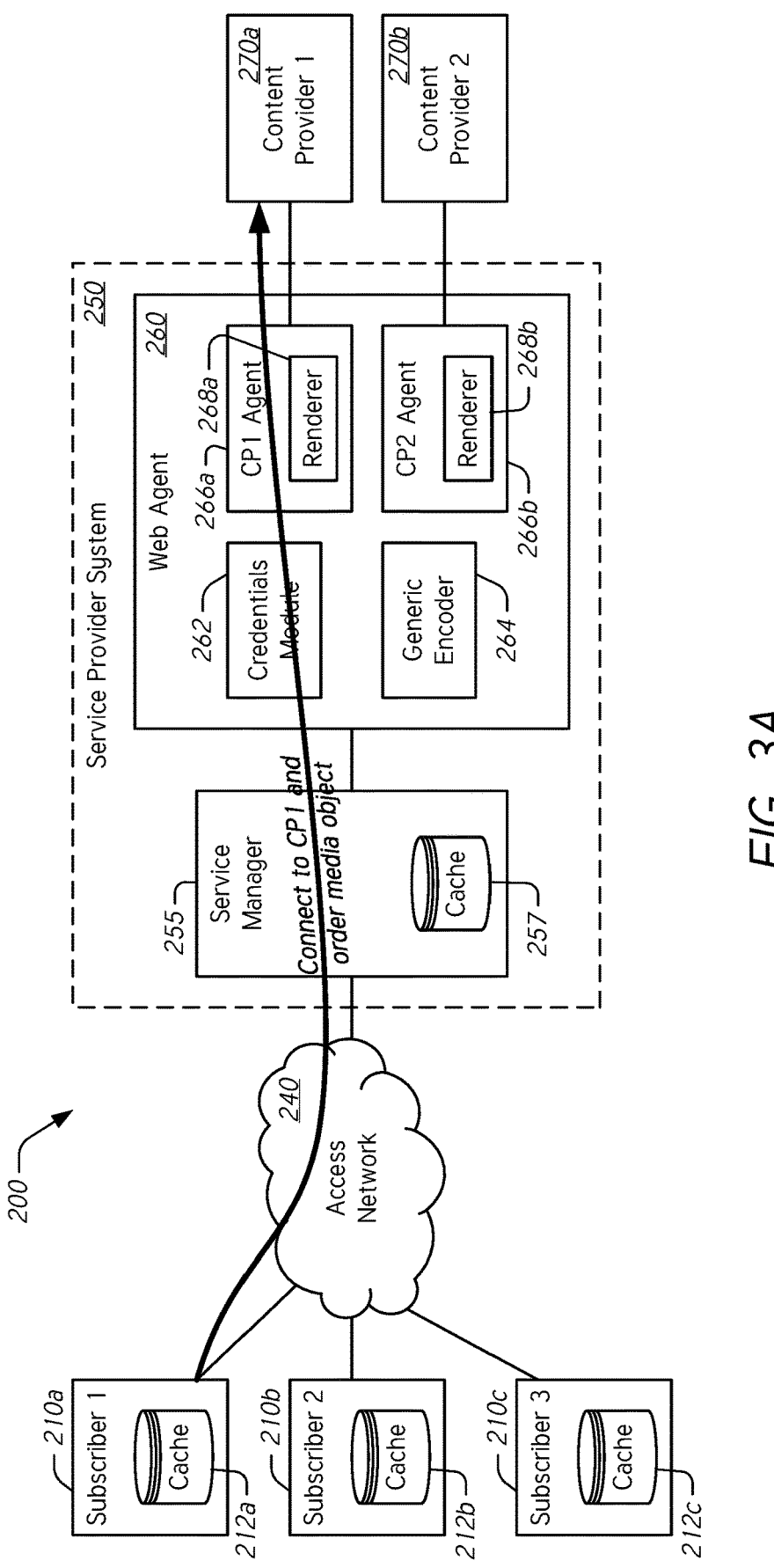
FIGS. 3A, 3B, 3C, 3D, 3E, 3F, 3G, and 3H illustrate steps in a process for providing a generically encoded media object to multiple subscribers that subscribe to different content providers.

FIG. 3A illustrates a first subscriber 210a connecting to the web agent 260 to request a media object (e.g., a movie) from a first content provider 270a. The connection to the content provider 270a is accomplished through the CP1 agent 266a which uses the subscriber's credentials from the credential module to authorize access to the requested media object from the first content provider 270a. In some embodiments, the CP1 agent 266a achieves authorization and access to the first content provider 270a by instantiating a virtual screen session with a virtual browser that acts as a user accessing the content provider's interface (e.g., a website or application). Thus, the content provider 270a is provided an expected interface to provide the requested media object (e.g., the content provider can stream the requested movie to the virtual browser).

Figure 3B:
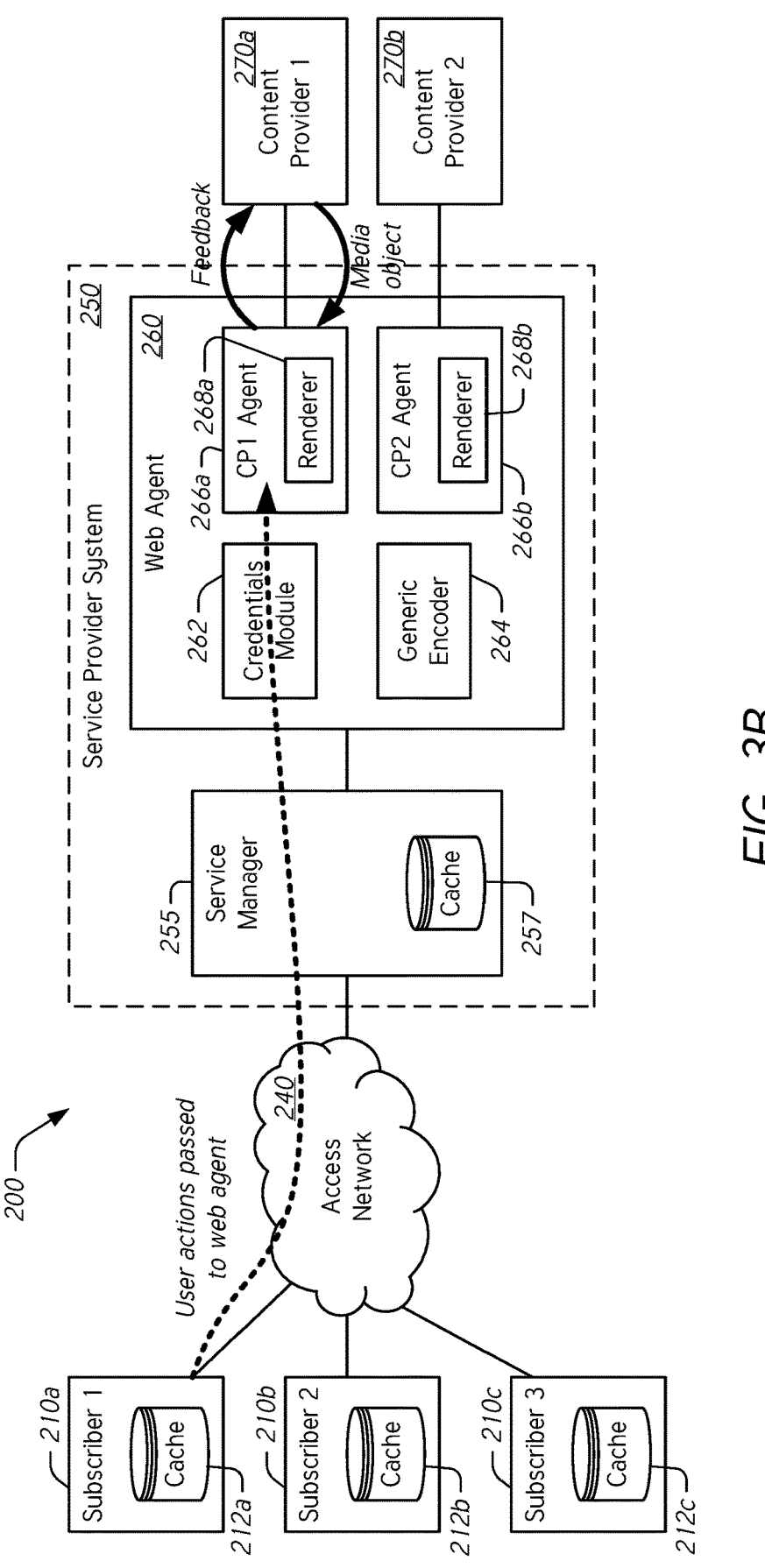

FIG. 3B illustrates the content provider 270a streaming the media object to the web agent 260 using the CP1 agent 266a. The content provider 270a receives feedback from the CP1 agent 266a corresponding to user actions that are passed to the CP1 agent 266a through the web agent 260. As the CP1 agent 266a receives frames of the media object in the encoding implemented by the first content provider 270a, the CP1 agent 266a utilizes the virtual screen session to render the media object using the renderer 268a. Rendering includes decoding the encoded media object into a playable version. As the CP1 agent 266a renders the media object in the virtual screen session, the CP1 agent produces and provides to the first content provider 270a the feedback (e.g., user interactions) the first subscriber produces and provides. The web agent 260 is thus transparent to the content provider 270a.

Figure 3C:
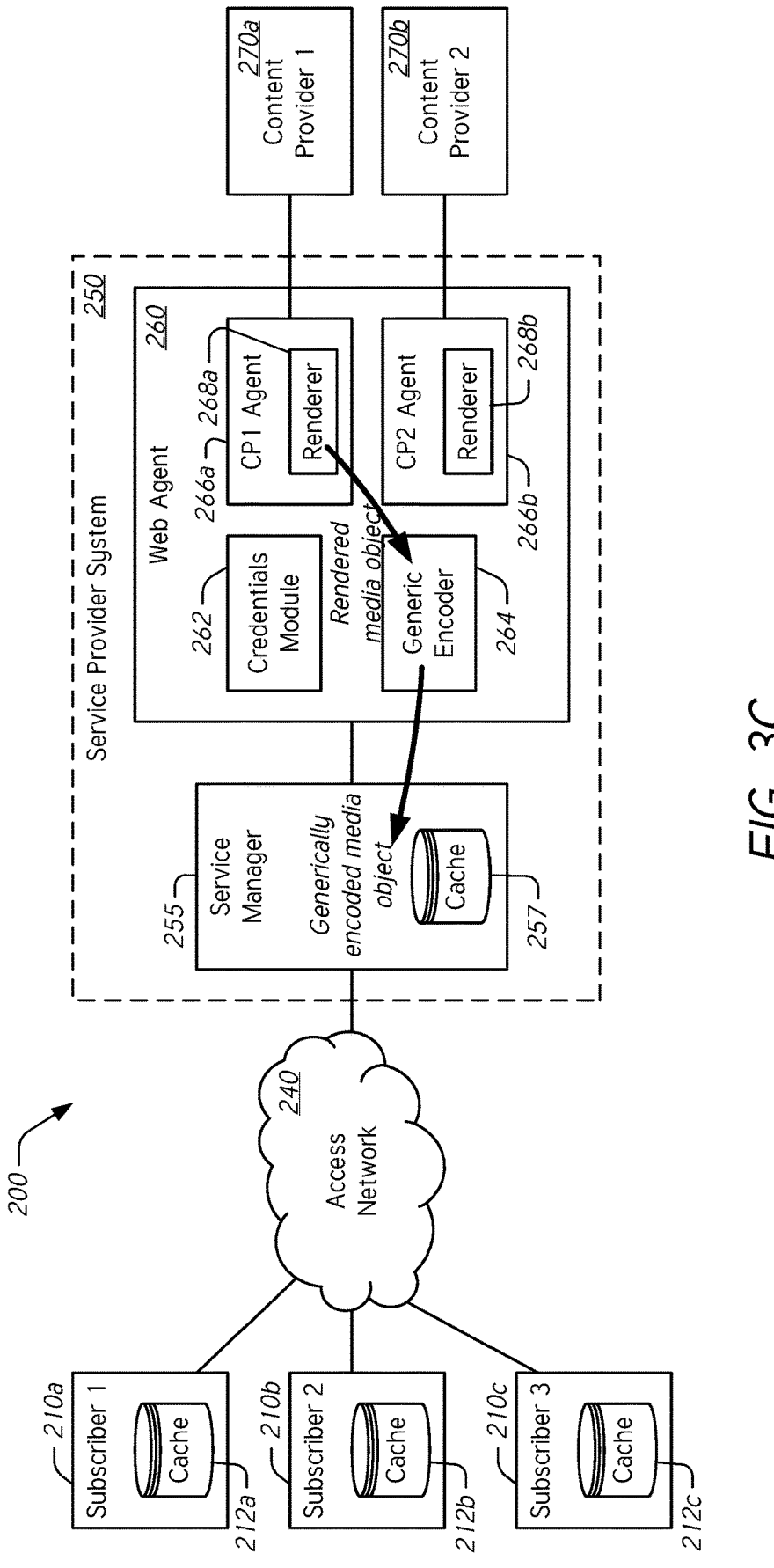

FIG. 3C illustrates the web agent 260 re-encoding the playable version of the media object using the generic encoder 264 to provide a generically encoded media object. The generically encoded media object is transmitted to the service manager 255.

Figure 3D:
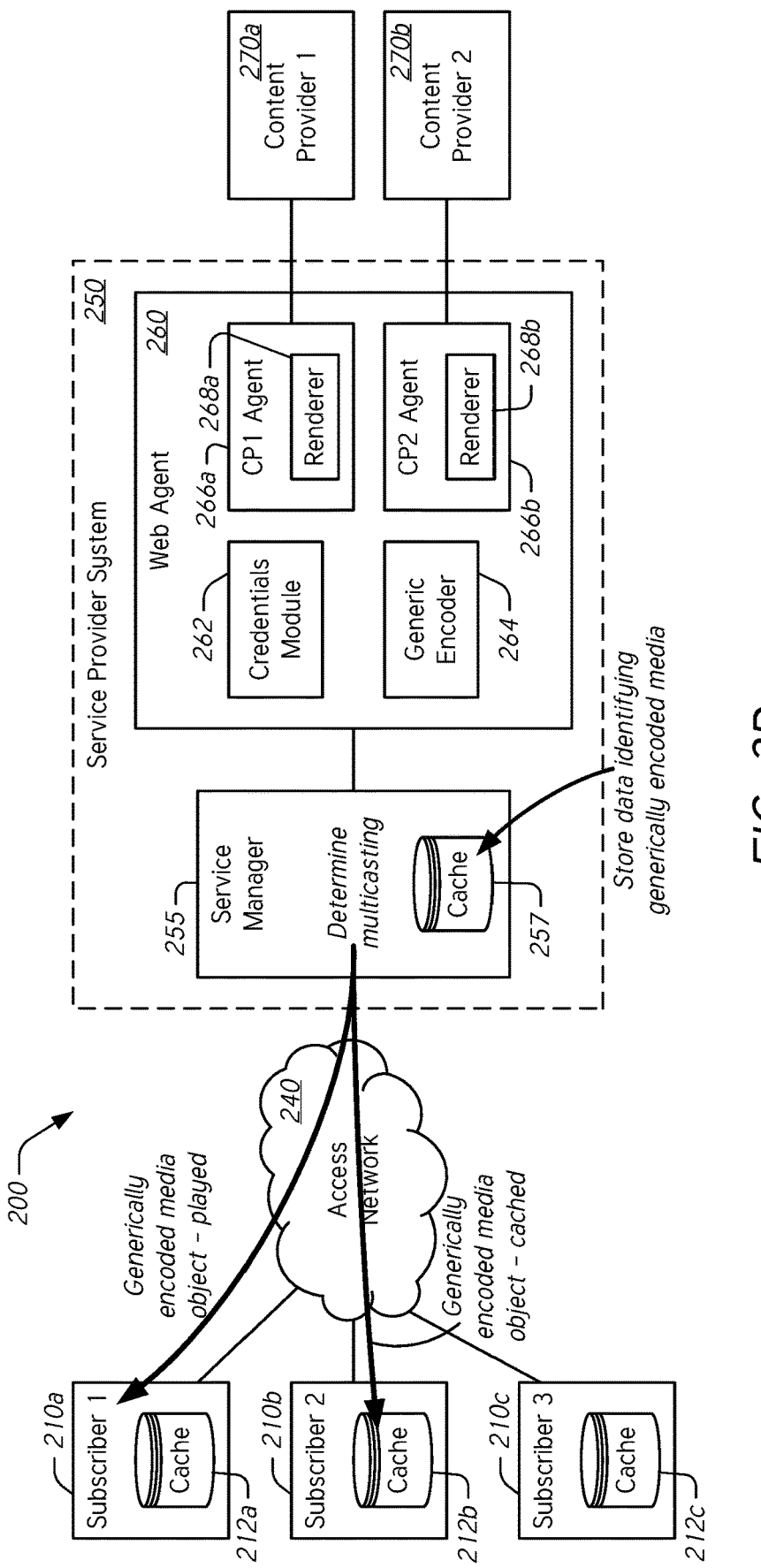

FIG. 3D illustrates the service manager 255 determining that it would be advantageous to multicast the generically encoded media object to another subscriber (the second subscriber 210b). For example, the service manager 255 may determine that the viewing tastes of the second sub- scriber 210b are similar to those of the first subscriber 210a and therefore is likely to order the same content from its content provider (e.g., the second content provider 270b).

In some embodiments, the web agent 260 can verify that the second subscriber 210b is authorized to access the media object from any of the content providers using the creden- tials module 262. If the second subscriber 210b is not authorized, the service manager 255 can determine to not multicast the media object to the second subscriber 210b. In some embodiments, this process can be accomplished by the web agent 260 rather than the service manager 255 or this process can be accomplished by the web agent 260 where the service manager is implemented as part of the web agent 260.

In addition, as the media object is encoded, fingerprinting information can be produced for storage in the cache 257. Metadata can also be extracted and stored in the cache 257. This can be done to enable identification of identical media objects from other content providers.

The service manager 255 can multicast the generically encoded media object to both the first subscriber 210a and to the second subscriber 210b. That is, the service provider system 250 multicasts the generically encoded media object to both the ordering subscriber and a non-ordering sub- scriber who is a customer of a different content service provider. In some embodiments, this process can be accom- plished by the web agent 260 rather than the service manager 255 or this process can be accomplished by the web agent 260 where the service manager is implemented as part of the web agent 260.

The service manager 255 stores data identifying the generically encoded media object and indicating that it was multicast to the second subscriber 210b for caching. The first subscriber 210a plays the generically encoded media object. The second subscriber 210b caches the generically encoded media object.

Figure 3E:
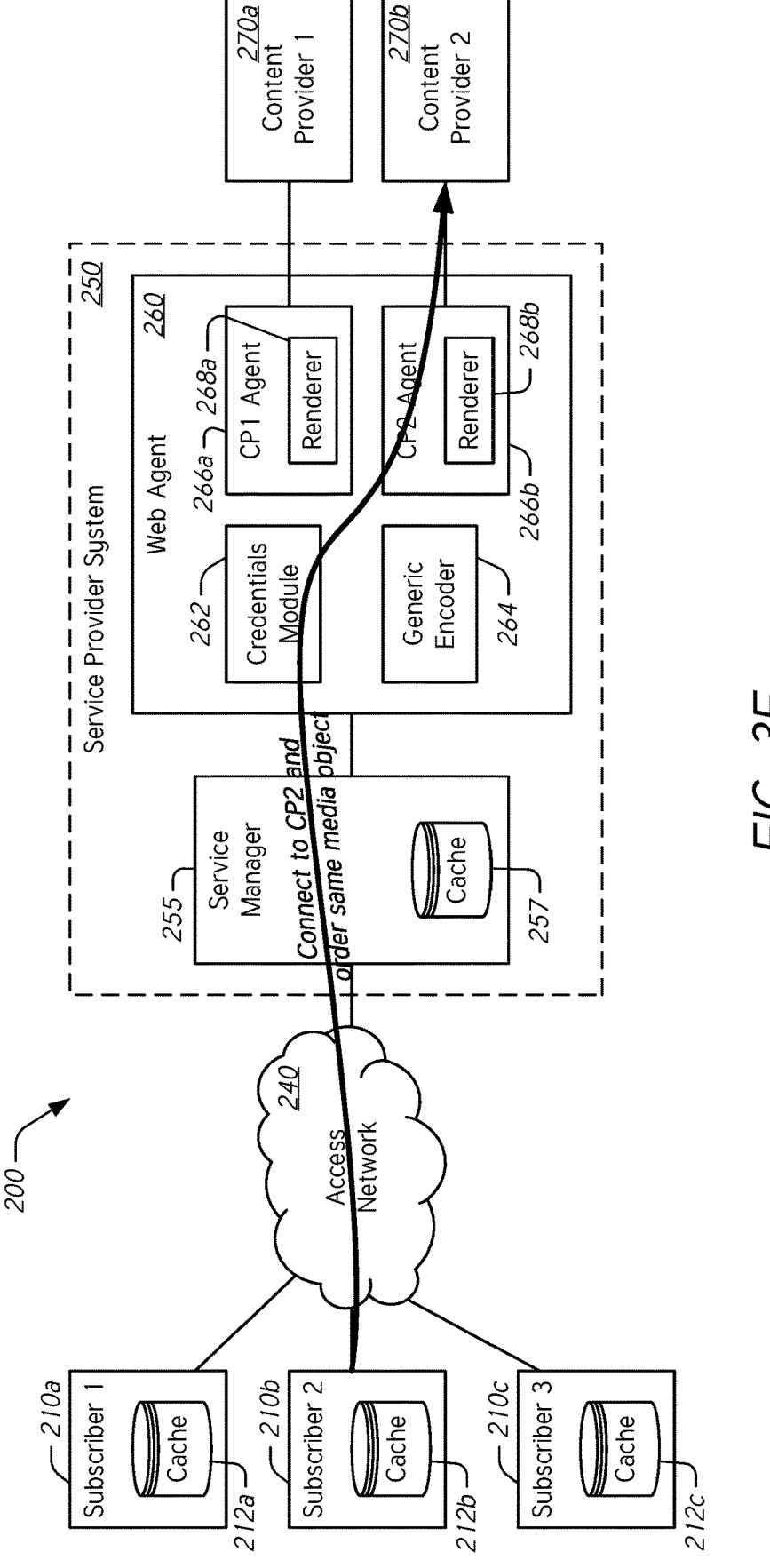

FIG. 3E illustrates the second subscriber connects to the web agent 260 and orders the same content (e.g., the same movie) as the first subscriber, but from the second content provider 270b. The web agent 260 determines that the second subscriber 210b is authorized to access the media object from the second content provider 270. The connection to the second content provider 270b is accomplished through the CP2 agent 266b which uses the subscriber's credentials from the credential module to authorize access to the requested media object from the second content provider 270b. The CP2 agent 266b can achieve authorization and access to the second content provider 270b by instantiating a virtual screen session with a virtual browser that acts as a user accessing the content provider's interface (e.g., a web- site or application). Thus, the second content provider 270b is provided an expected interface to provide the requested media object (e.g., the content provider can stream the requested movie to the virtual browser).

Figure 3F:
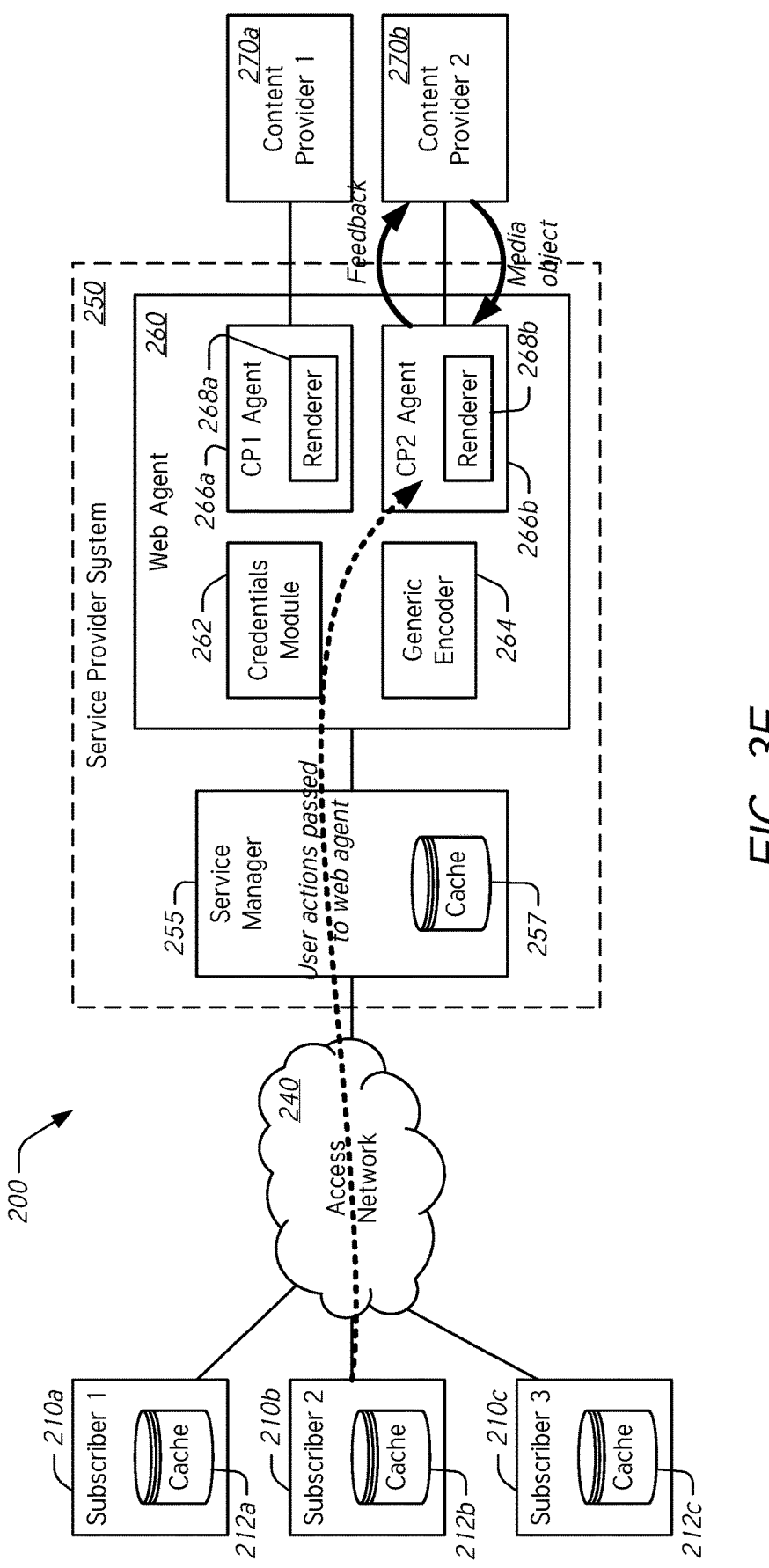

FIG. 3F illustrates the second content provider 270b streaming the media object to the web agent 260 using the CP2 agent 266b. The second content provider 270b receives feedback from the CP2 agent 266b corresponding to user actions that are passed to the CP2 agent 266b through the web agent 260. As the CP2 agent 266b receives frames of the media object in the encoding implemented by the second content provider 270b, the CP2 agent 266b utilizes the virtual screen session to render the media object using the renderer 268b. Rendering includes decoding the encoded media object into a playable version. As the CP2 agent 266b renders the media object in the virtual screen session, the CP2 agent 266b produces and provides to the second content provider 270b the feedback (e.g., user interactions) the second subscriber produces and provides. The web agent 260 is thus transparent to the second content provider 270b.

Figure 3G:
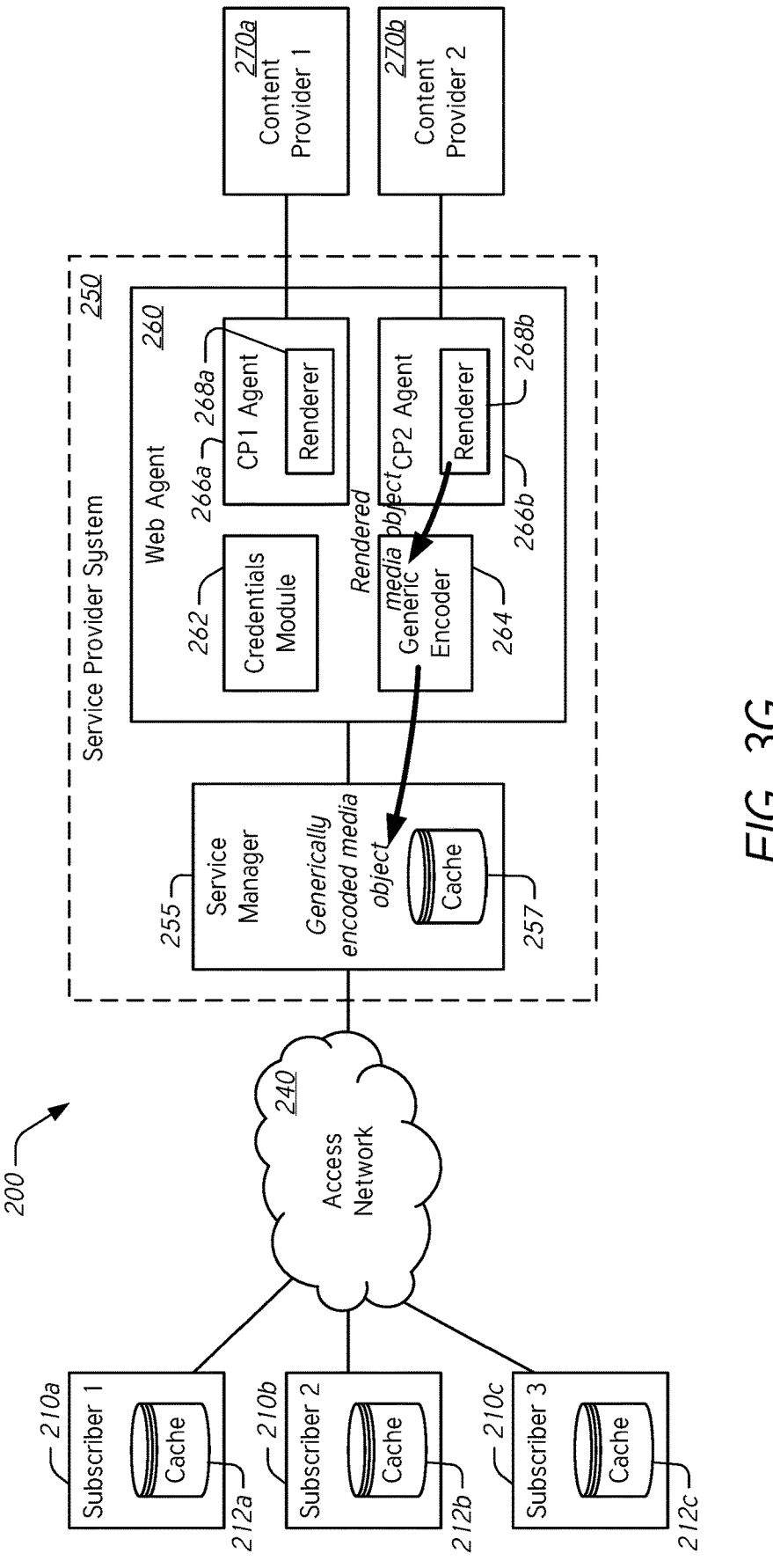

FIG. 3G illustrates the web agent 260 re-encoding the playable version of the media object using the generic encoder 264 to provide a generically encoded media object. The generically encoded media object is transmitted to the service manager 255.

Figure 3H:
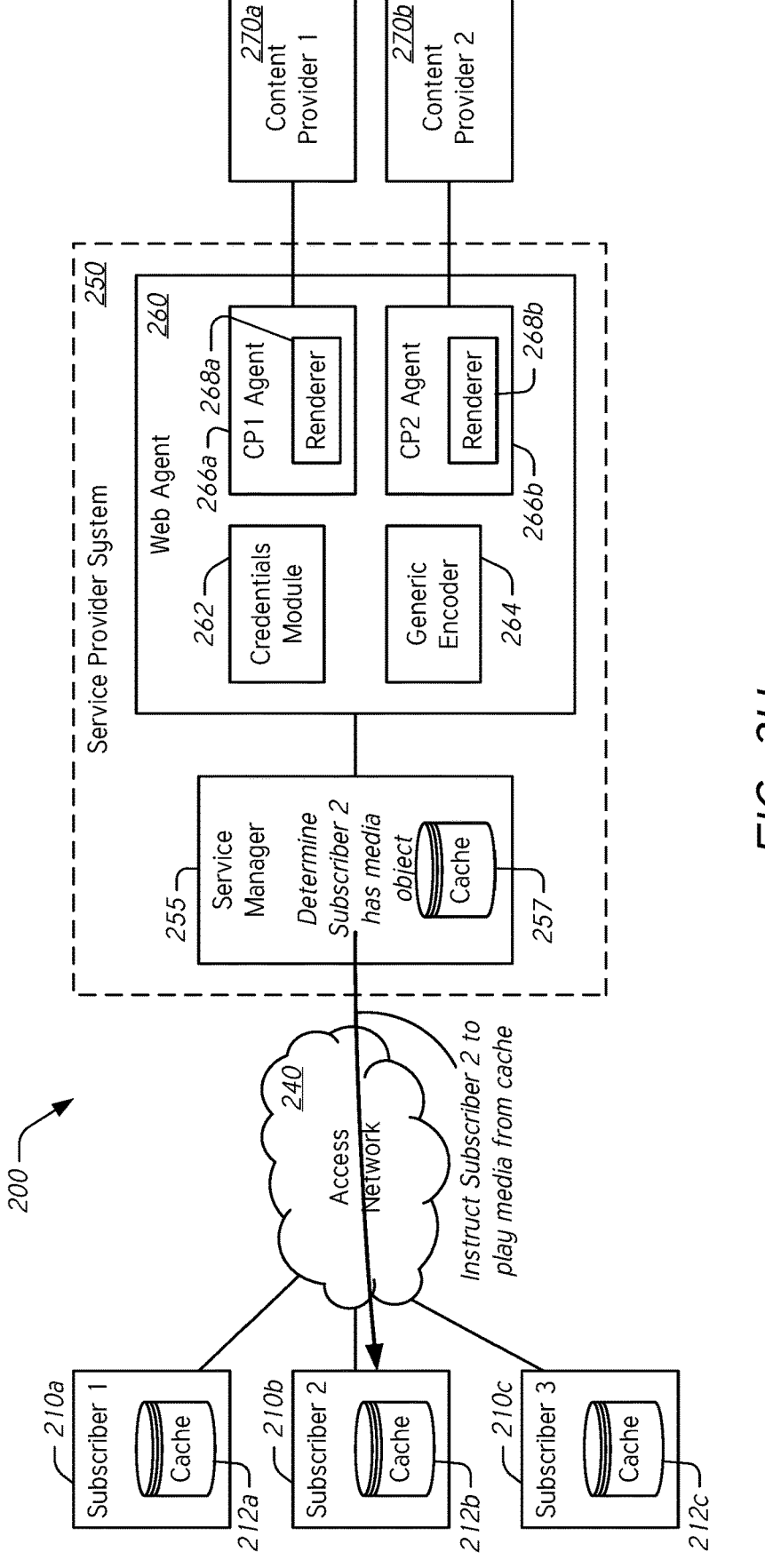

FIG. 3H illustrates that the service manager 255 deter- mines that the second subscriber 210b has the generic version of the media object in its cache. Examples of techniques for making this determination include matching metadata, checksums, or other distinguishing characteristics of the generically encoded media object from the second content provider 270b to characteristics of generically encoded media objects previously cached at the second subscriber 210b.

Having determined that the second subscriber 210b already has a generically encoded version of the requested media object in its cache 212b, the service manager 255 sends instructions to the second subscriber 210b to play the requested media object from its cache. In some embodi- ments, the second subscriber 210b may have cached only portions of the media object. In such cases, the service manager 255 may also send the missing portions of the media object to the second subscriber 210b.

In response to receiving the instruction to play the media object, the second subscriber 210b may then access the content it had previously stored and begin playback of the content. During playback of the content, the user may continue to interact with the client software, such as to pause, rewind, etc., the content. As discussed herein, such commands may be sent to the web agent 260, which may then input corresponding commands into the respective CP agent (e.g., CP2 agent 266b) to provide feedback to the content provider regarding the manner in which the user is viewing the content. For example, if the user inputs a "pause" command via the user interface for the client software, the client software may pause playback of the content, while also transmitting to the web agent 260 infor- mation indicating that the user has paused the content. The web agent 260 may then provide an input to the correspond- ing CP agent to cause a pause command to be transmitted to the content provider.

After the service manager 255 has instructed the non- requesting subscriber devices to receive and store data, the service manager 255 may maintain information to track content that has been stored at subscriber devices based on such instructions from the service manager 255. For example, the service manager 255 may maintain one or more database records identifying content stored at the subscribers 210a-c, such as by title, ID value, content provider, season and episode, etc. In some examples, the service manager 255 may send requests to one or more subscribers 210a-c requesting current cache status to determine which content has been stored at the subscribers 210a-c. Responses to such a request may identify stored content by title, etc., as discussed above, or it may identify dates and times when content was instructed to be stored and the corresponding amount of data, e.g., in cases where the subscribers 210*a-c* are not provided with information identifying what content they were instructed to store. The service manager 255 may then use such information to identify which data had been instructed to be stored at those corresponding dates and times.

At a later time, when a subscriber 210*a-c* requests content from a content provider 270*a-c* that has already been stored by the requesting subscriber 210*a-c*, irrespective of whether it is the same content provider that originally provided the stored content, the service manager 255 may determine that the content is available at the subscriber 210*a-c* and instruct the subscriber 210*a-c* to access the previously stored content, as described herein.

Figure 4:
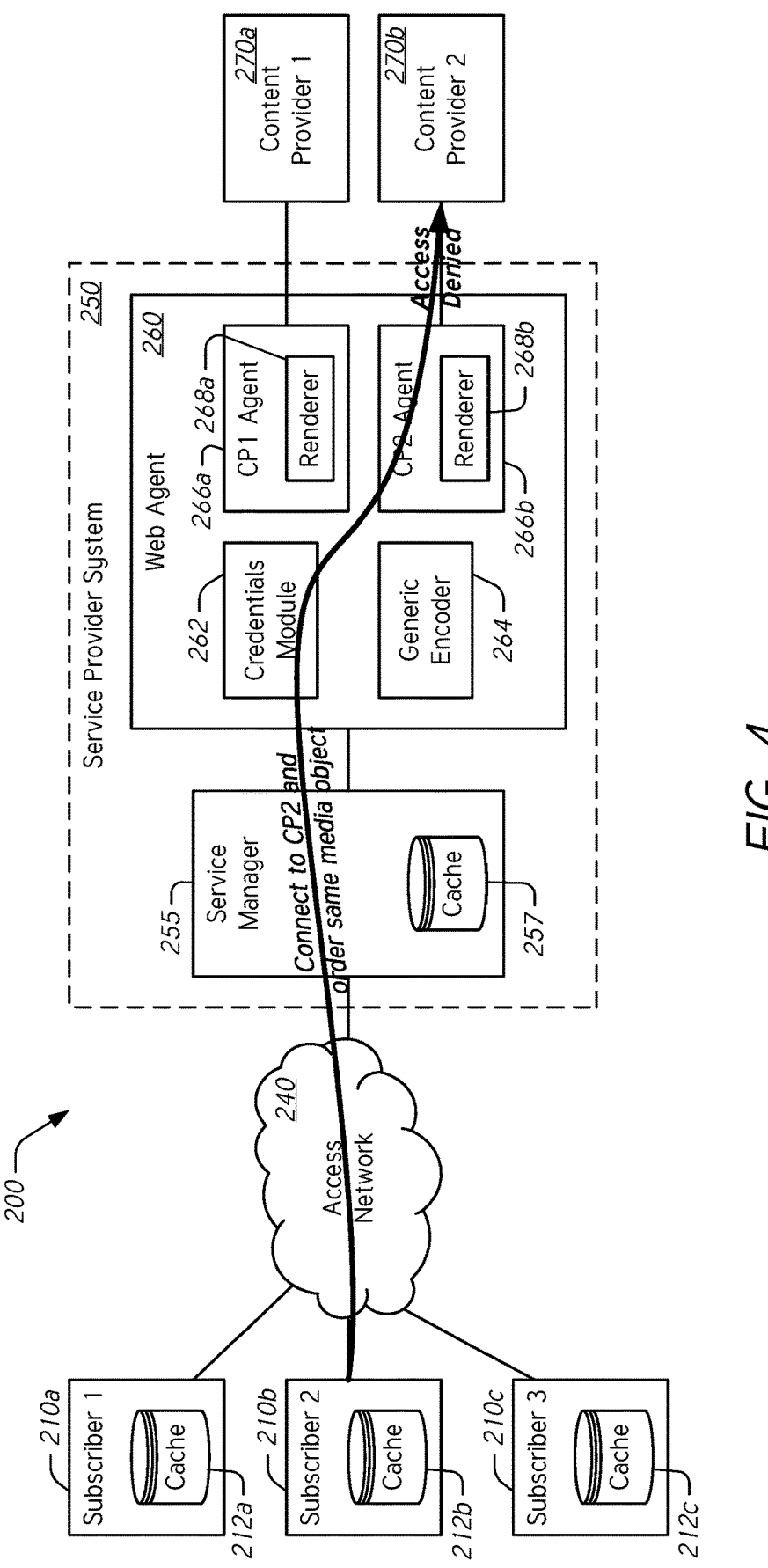
FIG. 4 illustrates variations of steps in the process of FIGS. 3A-3H.

FIG. 4 illustrates variations of steps in the process of FIGS. 3A-3H. For example, if the second subscriber 210*b* cancels or otherwise loses their subscription to the second content provider 270*b*, the web agent 260 discovers that the second subscriber's credentials are no longer valid. The web agent 260 may then abort the process above and send the second subscriber 210*b* an error message. Thus, the web agent 260 and service provider system 250 are configured to prevent offline viewing of cached media objects. The web agent 260 can be configured to require authorization verification prior to enabling access to cached media objects.

Figure 5:
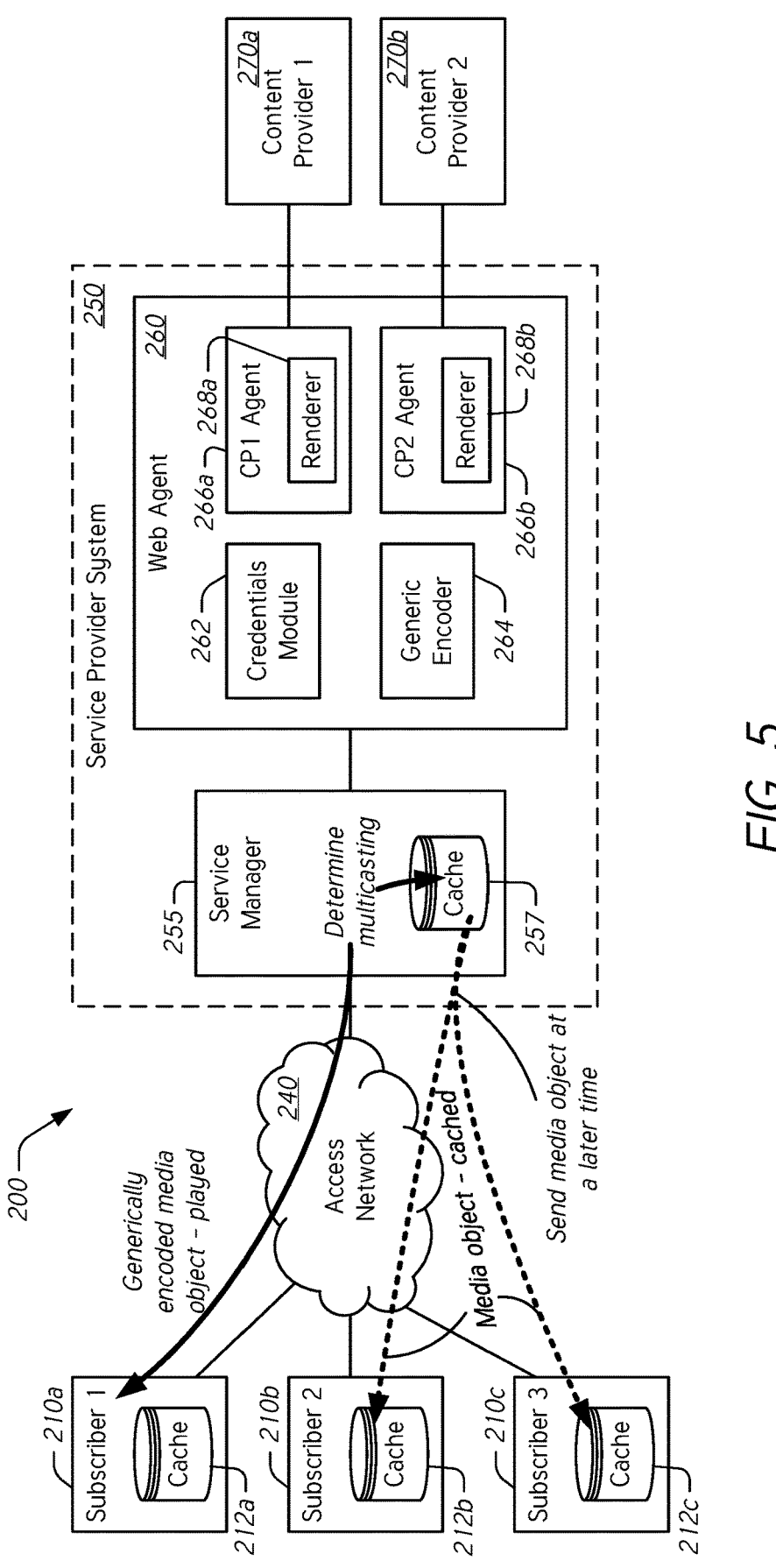
FIG. 5 illustrates other variations of steps in the process of FIGS. 3A-3H.

FIG. 5 illustrates other variations of steps in the process of FIGS. 3A-3H. In some embodiments, rather than multicasting the media object to non-ordering subscribers in FIG. 3D, the service manager 255 can queue a copy of the generically encoded media object for transmission to the second subscriber 210*b* and the third subscriber 210*c* during a low-congestion period of the access network 240. Examples of low-congestion periods include known time periods of light use (e.g., early morning hours) and time periods in which the congestion level, as monitored, drops below a threshold.

Figure 6:
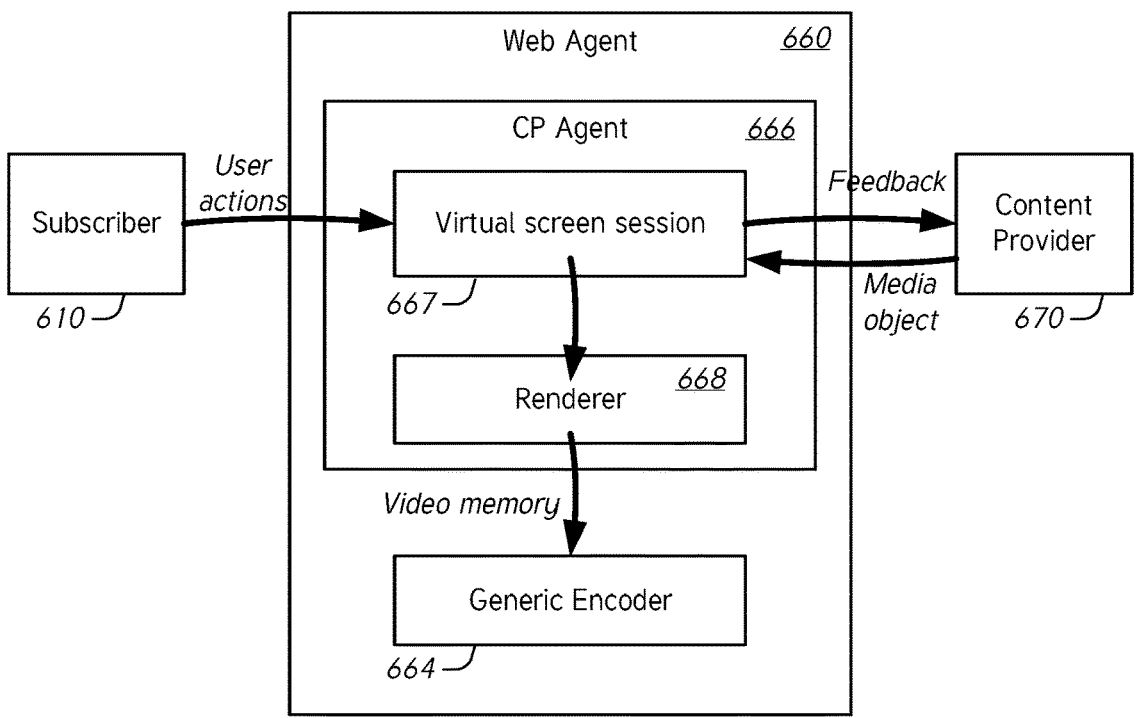
FIG. 6 illustrates a block diagram of an example process performed by a web agent to generically encode a media object.

FIG. 6 illustrates a block diagram of an example process performed by a web agent 660 to generically encode a media object. The web agent 660 is similar to the web agents 160, 260 described herein with reference to FIGS. 1-5. The web agent 660 is communicatively coupled to a subscriber 610 through an access network (not shown) as described herein and to a content provider 670 on the Internet as described herein. The web agent 660 includes a content provider agent 666, similar to the CP agents 266 described herein with reference to FIGS. 2-5. The CP agent 666 includes hardware and software functionality to instantiate a virtual screen session 667 and includes hardware and software functionality to render audiovisual content with a renderer 668 using the visual screen session 667. The web agent 660 includes a generic encoder 664 similar to the generic encoder 264 described herein with reference to FIGS. 2-5.

The web agent 660 is configured to run an instance of a specific application and/or a browser accessing a specific website corresponding to the application or website of the content provider 670. Content provided from the content provider 670 typically includes two layers of encryption: a content delivery network layer (CDN) such as HTTPS and a digital rights management (DRM) layer. The web agent 660 would typically be unable to access content from the content provider due at least in part to the layers of encryption. Thus, the web agent 660 is configured to access content through the content provider 670 based on access rights and authorization of the subscriber 610. The web agent 660 is thus limited to access to a similar degree as the subscriber 610. The web agent 660 is configured to provide credentials from the subscriber 610 to the content provider 670 through the CP agent 666 to verify that the subscriber 610 has sufficient rights to access the requested media object. This is done when the subscriber 610 requests access to the content from the content provider 670. This is the case even when a generically encoded media object resides in the subscriber's cache. Again, this is to make sure the subscriber 610 is authorized to access the content at the time the subscriber 610 is attempting to access the content. This prevents the subscriber 610 from accessing a cached copy of the content after the subscriber 610 loses authorization to the content (e.g., by allowing their subscription to the content provider to lapse).

The web agent 660 instantiates a virtual screen session with a virtual browser or virtual application running in the virtual screen session. The web agent 660 thus is able to proxy all of the actions the subscriber takes and pass it on to the content provider 670. This also allows the web agent 660 to render the media object and put it into video memory, which in turn enables the generic encoder 664 to create a generically encoded media object. The generically encoded media object can include some encryption specific to the web agent or ISP. However, the generic encoder 664 can be configured to remove the content provider's CDN encryption and/or DRM encryption or security, replacing it with the ISP's own encryption.

The subscriber 610 interacts with an application or website that proxies the subscriber's actions for the CP agent 666. The application or website is provided by the ISP and can be configured to mimic the content provider's application or website. The web agent 660 provides transparency between the content provider 670 and the subscriber 610 by providing the user's actions to the content provider 670 and by providing the media object from the content provider 670 to the subscriber 610. Actions that can be sent to the content provider through the CP agent 666 include mouse movements, mouse hovers, clicks or other interactions with the application or website, play, pause, rewind, fast forward, skip, click off, resume in the future, etc. The web agent 660 and CP agent 666 are configured to execute customized software to enable the subscriber 610 to access content provided by the content provider 670 without directly using software, e.g., client software, supplied by the content provider 670. For example, the subscriber 610 may ordinarily access the content provider 670 using the content provider's software client. Instead, the software client is executed by the CP agent 666 and the subscriber 610 executes a software client provided by the ISP. Thus, when a subscriber uses the ISP's software client to access the content provider 670, the ISP software client sends commands to the CP agent 666 to access that content provider. The CP agent 666 receives that command and runs the appropriate software client and sends commands to the content provider 670. Thus, it appears to the subscriber they are running the content provider's software client and interacting with it, even though interactions with the content provider 670 are actually handled by the web agent 660 based on commands sent from the ISP software client on the subscriber's device.

When the subscriber selects content to watch, the selection is sent from the ISP software client at the subscriber's device to the web agent 660, which then makes the selection using the CP agent 666. The selection is sent to the content provider 670, which then begins streaming the selected content to the CP agent 666 using the virtual screen session 667. The CP agent 666 receives the streamed content and decodes it using the application running on the virtual screen session 667. The CP agent 666 then renders the decoded data as video frames using the renderer 668. The generic encoder 664 captures the rendered video frames and re-encodes them. The re-encoded rendered video frames can then by multicast to the subscriber and other non-ordering subscribers of the ISP. The subscriber 610 can use the ISP software client to watch the media object.

The CP agent 666 is configured to operate so that it appears that the subscriber 610 is interacting with the content provider's software client. The subscriber 610 may browse the content available from the content provider 670 and select content to view. Commands entered by the subscriber are transmitted to the CP agent 666 and used to send commands to the content provider 670, such as to select content to view. These content control commands may include commands used during playback of content, such as pause, rewind, fast forward, skip commands, etc. Each of these content control commands may then be sent to the CP agent 666, which may generate a corresponding input to the content provider's software client running in the virtual screen session 667. However, it should be appreciated that the content control commands may be affected locally, e.g., a pause command, even if the content control commands are also sent to the service provider. Thus, the subscriber may immediately experience the pausing of the content, even if the content control command does not reach the content provider 670 immediately. As discussed herein, providing subscriber 610 actions to the content provider 670 may enable the content provider 670 to determine viewing statistics or other information about viewer engagement with its content. In some embodiments, the subscriber 610 watches a cached media object and despite the content being played from the data store, the subscriber may still issue playback commands, such as pause, rewind, etc. These commands may still be used to affect playback locally at the subscriber 610 and will also be transmitted to the content provider 670 through the CP agent 666.

Web Agent Hardware

Figure 7:
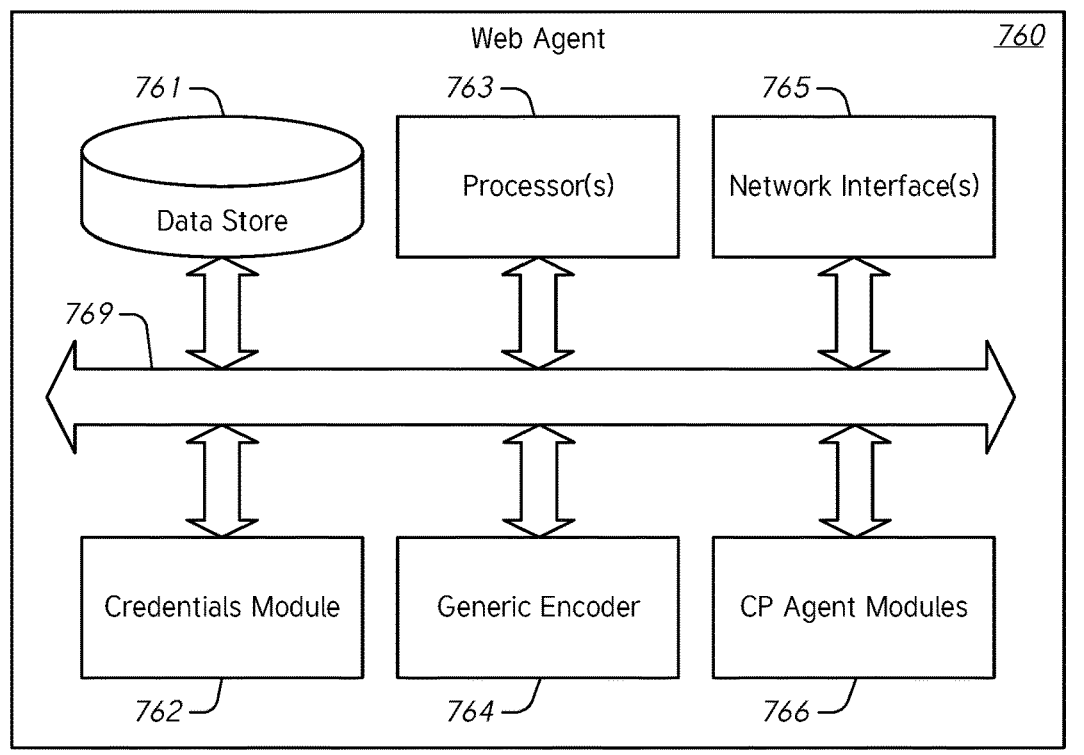
FIG. 7 illustrates a block diagram of an example web agent.

FIG. 7 illustrates a block diagram of an example web agent 760. The web agent is similar to the web agents 160, 260, 660 described herein with reference to FIGS. 1-6 and can be implemented in the network environments there described. The web agent 760 is configured to generate generically encoded media files from a plurality of content providers to enable subscribers to access cached media objects rather than streaming media directly from content providers, thereby reducing bandwidth consumption. The web agent 760 can employ any method described herein for reducing bandwidth consumption using generically encoded media, such as the example methods 800, 900 described herein with reference to FIGS. 8, 9A, and 9B.

The web agent 760 can include hardware, software, and/or firmware components for rendering media objects, encoding media objects, generating content-identifying information (e.g., fingerprinting) for media objects, proxying websites and applications for subscribers, authorizing access to media objects, and the like. The web agent 760 can include a data store 761, one or more processors 763, network interfaces 765, a credentials module 762, a generic encoder module 764, and a plurality of CP agent modules 766. Components of the web agent 760 can communicate with one another, with external systems, and with other components of a network using communication bus 769. The web agent 760 can be implemented using one or more computing devices. For example, the web agent 760 can be implemented using a single computing device, multiple computing devices, a distributed computing environment, or it can be located in a virtual device residing in a public or private computing cloud. In a distributed computing environment, one or more computing devices can be configured to provide the modules described herein to provide the described functionality. The web agent 760 can be implemented as part of an ISP network environment or as a service provided by systems not directly operated or controlled by the ISP (e.g., as a service implemented in a cloud platform).

The web agent 760 includes the credentials module 762. The credentials module 762 is configured to provide subscriber authentication credentials (e.g., username and password) to content providers to enable access to media objects provided by the content providers. The credentials module 762 can receive a request from a subscriber for a media object and the credentials module 762 can authenticate access to the media object.

The web agent 760 includes the generic encoder module 764. The generic encoder module 764 is configured to generate a generically encoded media object from rendered media objects. The generic encoder module 764 is configured to extract audiovisual data from video memory and to create encoded media objects using a generic encoding that may or may not include encryption.

The web agent 760 includes the plurality of CP agent modules 766. Each CP agent module 766 is configured to interface with a specific content provider. A particular CP agent module 766 is configured to provide a virtual screen session that runs a content provider application or a browser that accesses a content provider website. The CP agent module 766 is further configured to pass user actions through to the content provider. This can be accomplished by mirroring or repeating user actions in the virtual screen session. The CP agent module 766 is configured to render media objects provided by content providers, effectively removing encryption layers such as CDN and DRM. The CP agent module 766 is configured to use the virtual screen session and a renderer to put audiovisual data into video memory for the generic encoder module 764.

In some embodiments, the first time the web agent 760 encounters a media object, it is configured to generate a fingerprint of the media object and/or fingerprints of chunks of the media object. As used herein, the term fingerprint can refer to any suitable process of generating content-identifying information that corresponds to the content of audiovisual data. A goal of generating such information is to identify where a piece of content sent through different content providers is the same content. This does not require the pieces of content from the different content providers be bitwise identical. The web agent 760 is also configured to re-encode the media object using a generic encoding scheme to enable any suitable subscriber of the ISP to access the media object with suitable authorization. The web agent 760 is also configured to send the generically encoded media object to the subscriber that requested the media object.

In some embodiments, the second time the web agent 760 encounters the same media object, it is configured to compute a fingerprint of the media object and/or fingerprints of chunks of the media object. If the web agent 760 recognizes that the generically encoded version of the media object is in its main data store 761, it is configured to send the generically encoded version of the media object to the requesting subscriber, provided that the generically encoded media object is not already in edge storage at the subscriber.

In some embodiments, the third time the web agent 760 encounters the same media object, it is configured to compute a fingerprint of the media object and/or fingerprints of chunks of the media object. If the web agent 760 determines that the subscriber has a copy of the generically encoded media object in the subscriber's cache, the web agent 760 is configured to send fingerprints to the subscriber so that the subscriber can look up the generically encoded media object and play it locally.

In certain embodiments, the fingerprints can be calculated by the generic encoder as it encodes the media object and/or after it has been generically encoded. The fingerprints are configured to enable identification of identical media objects without necessarily being byte accurate. This is because the generically encoded media object can be generated from a first encoding provided by a first content provider while a current media object is being generated from a second encoding provided by a second content provider. Even where the media object is the same piece of content (e.g., the same movie), the different encodings applied by the content providers result in different data streams so that they are not byte-by-byte identical. Thus, the fingerprinting is configured to identify media objects that are the same without comparing them byte-for-byte.

The web agent 760 includes one or more network interfaces 765 to interface with one or more access networks and the Internet. The web agent 760 includes one or more processors 763 that are configured to control operation of the modules 762, 764, 766 and the data store 761. The one or more processors 763 implement and utilize the software modules, hardware components, and/or firmware elements configured to access, render, and generically encode media objects. The one or more processors 763 can include any suitable computer processors, application-specific integrated circuits (ASICs), field programmable gate array (FPGAs), or other suitable microprocessors. The one or more processors 763 can include other computing components configured to interface with the various modules and data stores of the web agent 760.

The web agent 760 includes the data store 761 configured to store configuration data, device data, databases, data tables, algorithms, executable instructions (e.g., instructions for the one or more processors 763), and the like. The data store 761 can be any suitable data storage device or combination of devices that include, for example and without limitation, random access memory, read-only memory, solid-state disks, hard drives, flash drives, bubble memory, and the like. The data store 761 can be used to store generically encoded media objects, metadata, subscriber data, and the like.

Methods for Using Generically Encoded Media Objects to Improve Network Use

Figure 8:
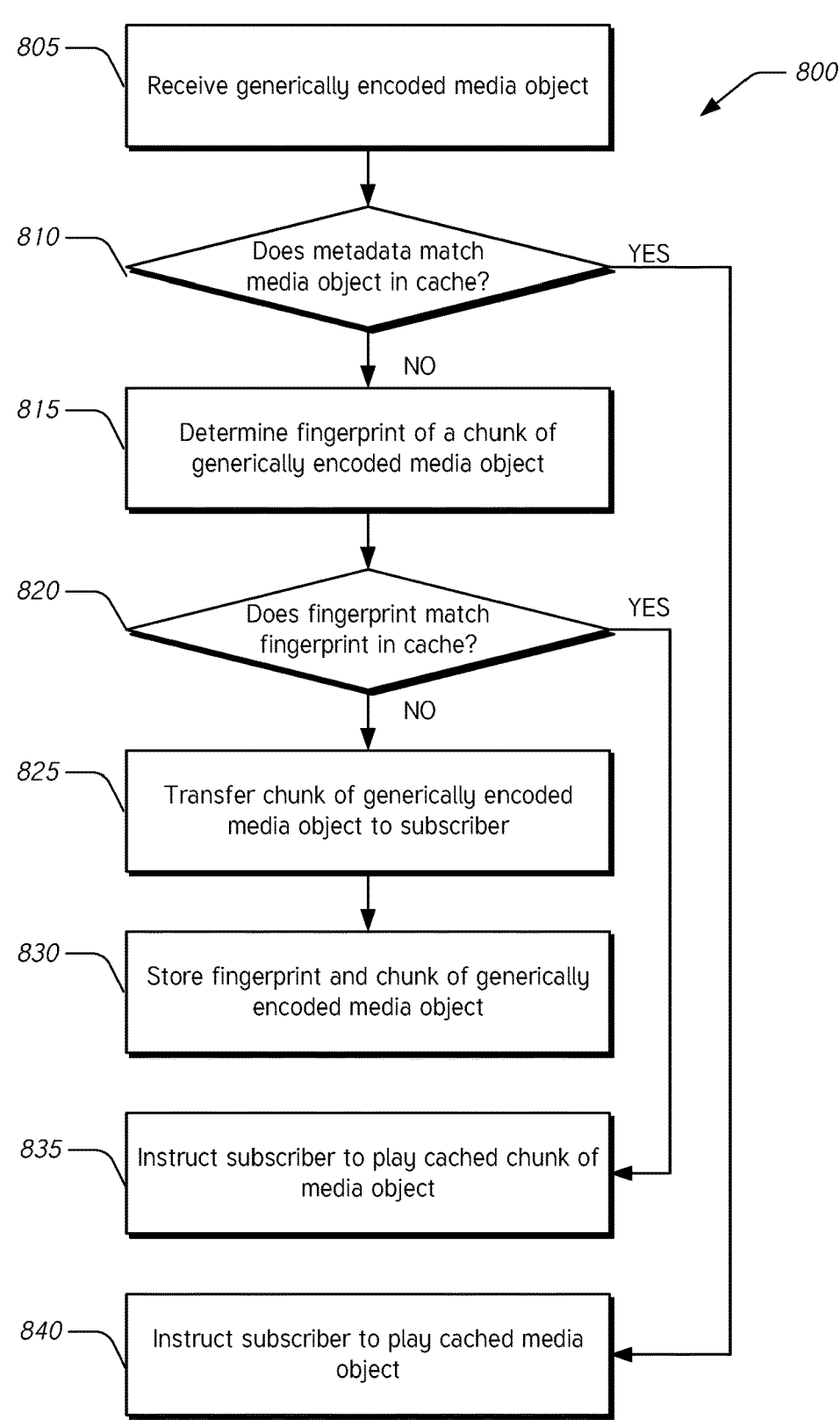
FIG. 8 illustrates a flow chart of a method for determining whether a generically encoded media object matches a previously provided generically encoded media object.

FIG. 8 illustrates a flow chart of a method 800 for determining whether a generically encoded media object matches a previously provided generically encoded media object. The method 800 can be performed by any of the service provider systems described herein with reference to FIGS. 1-7, such as the web agent 160, 260, 660, 760. For ease of description, the method 800 will be described as being performed by a service provider system. This is not to be understood to limit the scope of the disclosure. Rather, any step or portion of the method 800 can be performed by any component or combination of components of the systems described herein.

In block 805, the service provider system receives a generically encoded media object. The generically encoded media object can be generated be a generic encoder implemented in a web agent. In some embodiments, the generically encoded media object is in a cache or data store of the service provider system.

In block 810, the service provider system determines whether the metadata of the generically encoded media object matches a media object stored in cache at a subscriber. In some embodiments, the manifest file is also compared, where the manifest file corresponds to a file that identifies the ordering of the series of chunks for playback. If so, the service provider system instructs the subscriber to play the cached media object in block 840.

If the metadata does not match, the service provider system determines a fingerprint of a chunk of a generically encoded media object in block 815. The service provider system can be configured to break a media object into multi-second chunks (e.g., chunks of 2 seconds, 4 seconds, 8 seconds, etc.). A fingerprint or characteristic number can be determined for individual chunks. A fingerprint can be determined by computing a hash value or other fingerprint of one or more video frames. As used herein, the term fingerprint can refer to any suitable process of generating content-identifying information that corresponds to the content of audiovisual data. A goal of generating such information is to identify where a piece of content sent through different content providers is the same content. This does not require the pieces of content from the different content providers be bitwise identical.

In block 820, the service provider system determines whether the fingerprint matches a fingerprint of a media object (or chunk of a media object) in cache. If so, the service provider system is configured to instruct the subscriber to play the chunk of media object from its cache in block 835. To be considered a match, the chunks need not be bit-for-bit identical, rather it is sufficient that the chunks are sufficiently similar to be considered a match. For example, the same content obtained from multiple different content providers may different slightly, e.g., in color palettes, audio encoding algorithms, etc. However, by using downsampling or fingerprinting, such slight differences may be reduced or eliminated, enabling comparison of content titles from multiple different content providers. Further, generically encoded media objects that are fingerprinted after encoding may result in identical content having more similar fingerprints. Such a technique may help reduce the impact of different encoding schemes used by different content providers. This can be repeated for each chunk of the media object. A fingerprint can be compared to corresponding or nearby frames in previously streamed or cached content. Such a comparison may allow the service provider system to determine the identity of a particular content feature and then determine whether the content has been cached at a subscriber. Comparing fingerprints may also include content recognition which may be performed on video images using any suitable technique. For example, one or more video frames may be downsampled and one or more fingerprints may be generated and compared against previously captured fingerprints of previously requested content. For audio content, a similar fingerprinting process may be used for short sampled periods, e.g., 1-10 seconds, of audio. For downloaded software, a file name may be used as identifying information or a hash value for the software may be calculated and compared against hash values for previously retrieved software.

If the fingerprint does not match, the service provider is configured to transfer the chunk of generically encoded media object to the subscriber in block 825. In block 830, the service provider system is configured to store the fingerprint and/or chunk of generically encoded media object for future comparison. Once received content has been recognized or fingerprinted, identifying information may be stored in a data store, or existing identifying information may be updated based on the most recent recognition process. For example, updated fingerprint information or updated metadata or manifest information may be stored in the data store or merged with existing fingerprint, metadata, or manifest information. For example, different fingerprint information may be stored for a particular content title for each content provider it has been received from, which may enable easier identification of the content when it is subsequently received again.

In some embodiments, media objects are delivered with commercials or ads interspersed in the presentation. This may provide some challenges in identifying media objects as the same content because commercials provided by different content providers may be difficult. In such situations, the service provider system can be configured to be continuously or repeatedly determining fingerprints of media objects being requested and streamed. If a media stream has had a sequence of matching fingerprints that is then suddenly interrupted with non-matching fingerprints, the non-matching fingerprints and the corresponding chunks can be separated out from the other media object data stream. These can be collected to generate a data base of generically encoded ads. These can then be served in place of streaming ads where similar criteria are met, e.g., that the ads being provided by the content provider match ads that are in a subscriber's cache. This may also help to improve bandwidth utilization.

In some embodiments, a content provider may include a watermark in their media objects. If it is interstitial, the portions (of time) where the media objects include the watermark can be transferred to the subscriber whereas non-watermarked portions can be played from cache, if they exist in a subscriber's cache. Advantageously, fingerprint matching can be configured to identify where media objects include watermarks due to a dissimilarity in the fingerprints of media objects for the same content. In this way, the service provider system can avoid transmitting media objects with watermarked content to a subscriber that does not subscribe to a content provider with the same watermark.

Figure 9A:
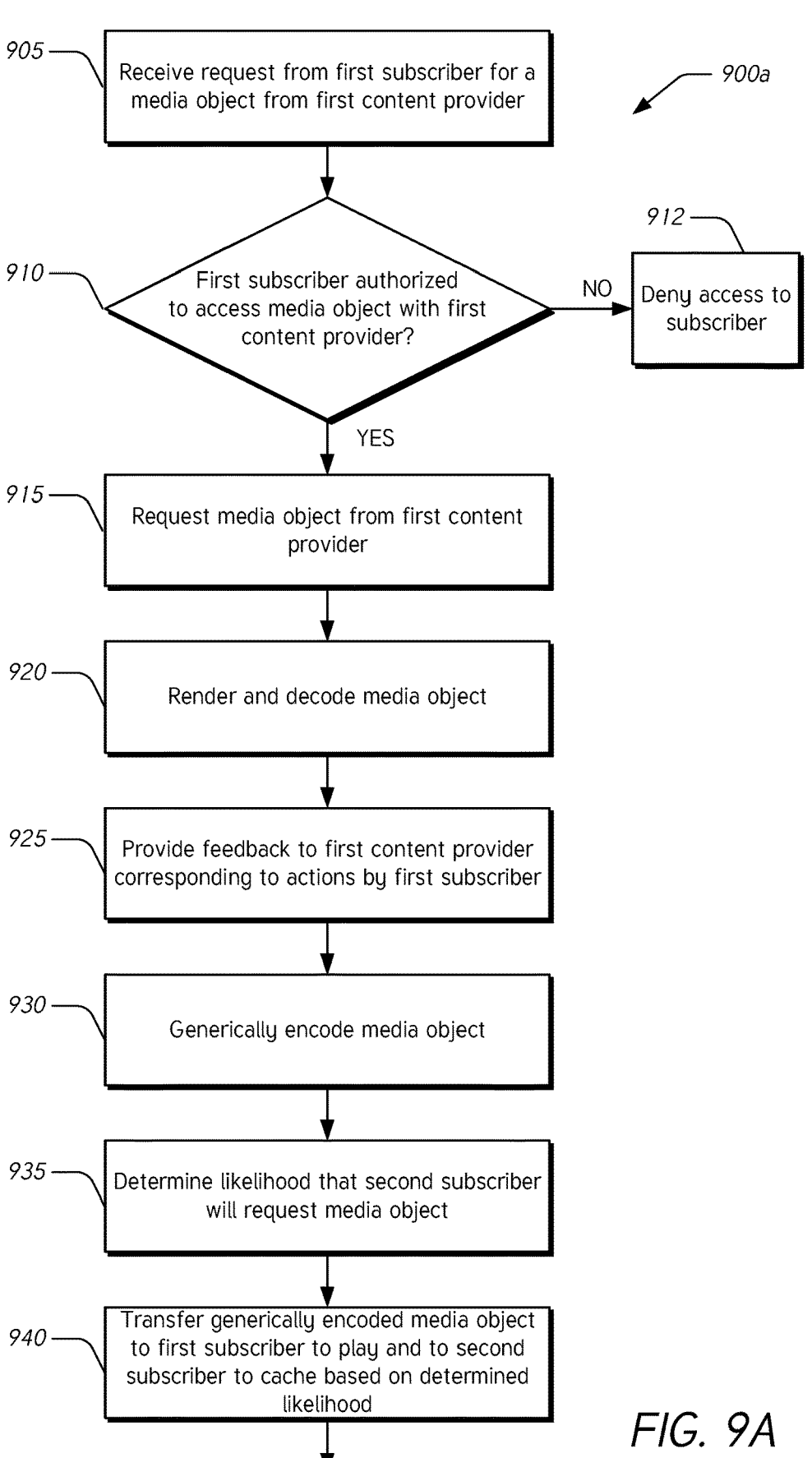
FIGS. 9A and 9B illustrate flow charts of example methods for multicasting a generically encoded media object to subscribers of different content providers.
Figure 9B:
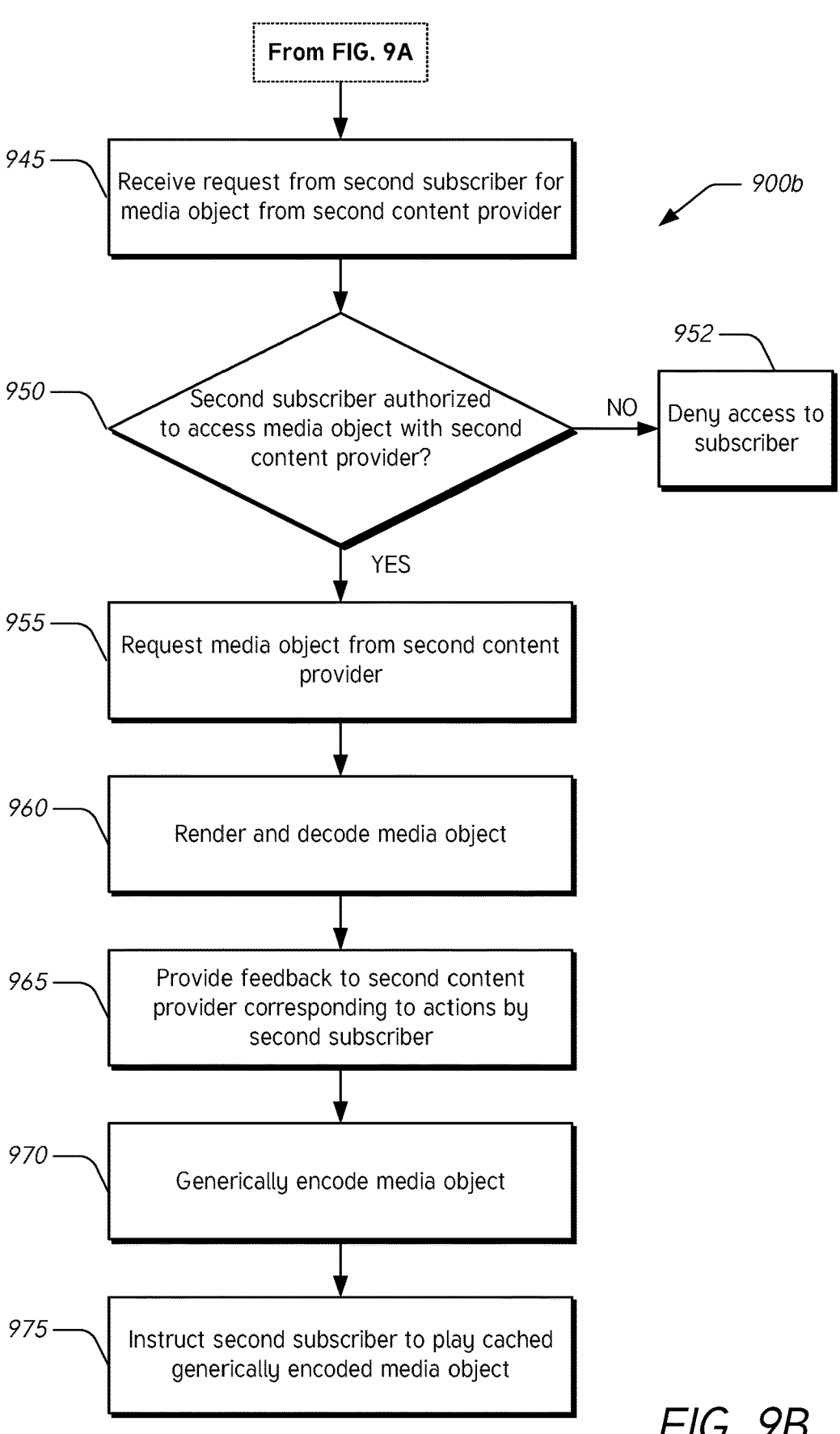

FIGS. 9A and 9B illustrate flow charts of example methods 900a, 900b for multicasting a generically encoded media object to subscribers of different content providers. The method 800 can be performed by any of the service provider systems described herein with reference to FIGS. 1-7, such as the web agent 160, 260, 660, 760. For ease of description, the method 800 will be described as being performed by a service provider system. This is not to be understood to limit the scope of the disclosure. Rather, any step or portion of the method 800 can be performed by any component or combination of components of the systems described herein.

In block 905, the service provider system receives a request from a first subscriber for a media object from a first content provider. In block 910, the service provider system determines whether the first subscriber is authorized to access this content with the first content provider. If not, the service provider system denies access to the subscriber in block 912.

In block 915, the service provider system requests the media object from the first content provider using a content provider agent in a web agent. Using a virtual screen session, the service provider system renders and decodes the media object, in block 920. Simultaneously, the service provider system provides feedback to the first content provider corresponding to actions by the first subscriber, in block 925.

In block 930, the service provider system generically encodes the media object. By using the same encoding scheme (e.g., a generic encoding scheme for all media objects in the service provider system), rather than using the same encoding scheme used by the content provider, the service provider system may provide uniformly encoded content to other portions of the system, such as to a component that attempts to recognize the received content. As discussed herein, different content providers may encode content using different encoding schemes. Consequently, a content title encoded by one content provider may appear somewhat different from the same content title encoded by a different content provider. By encoding content that has been decoded and rendered using a common encoding scheme, some of these variations may be reduced or eliminated, providing input to recognition components that has less variance despite being received from different content providers.

In block 935, the service provider system determines the likelihood that a second subscriber will request the same media object, either from the same content provider or from a different content provider. The likelihood can be based at least in part on past viewing behaviors, a large overlap in viewing taste, the popularity of the media object at large, or the like.

In block 940, the service provider system transfers the generically encoded media object to the first subscriber to play and to the second subscriber to cache based on the likelihood determined in block 935. Transfer of the generically encoded media object can happen simultaneously with the first subscriber watching the media object (e.g., while streaming the object). This enables the service provider system to provide user actions to the content provider in block 925 while the first subscriber is watching the media object.

Referring now to FIG. 9B, in block 945, the service provider system receives a request from a second subscriber for the same media object from a different content provider. In block 950, the service provider system determines whether the second subscriber is authorized to access the requested media object. If not, the second subscriber is denied access in block 952.

In block 955, the service provider system requests the media object from the second content provider through a content provider agent. In block 960, the service provider system renders and decodes the media object using a virtual screen session, as described herein. Simultaneously, the service provider system provides feedback to the second content provider corresponding to actions by the second subscriber, in block 965.

In block 970, the service provider system generically encodes the media object, as described herein. In block 975, the service provider system instructs the second subscriber to play the matching generically encoded media object in its cache based on a determination that the media objects are the same content, examples of which are described herein, such as the method 800 described herein with reference to FIG. 8.

Additional Embodiments and Terminology

As used herein, the terms "generically encoded" or "generic encoding" may refer to any digital encoding of a digital file or digital data that is accessible to the subscribers and does not necessarily refer to any particular encoding scheme. Thus, the term generic is used in a broad sense to differentiate it from proprietary encoding schemes that limit access to media objects to customers of specific content providers.

As used herein, the term "fingerprint" or "fingerprinting" can refer to any suitable process of generating content-identifying information that corresponds to the content of audiovisual data. For example, a fingerprint can characterize visual data, audio data, a combination of audio and visual data, or the like. A goal of generating such information is to identify where a piece of content sent through different content providers is the same content. The disclosed fingerprinting techniques do not necessarily require the pieces of content from the different content providers be bitwise identical meaning that the disclosed content-identifying information and techniques for generating such information can be configured to determine that content from different content providers is the same content even where encoding schemes or other variables differ from one content provider to another.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be openended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system comprising:

a network interface;

a non-transitory computer-readable medium; and a processor communicatively coupled to the network interface and the non-transitory computer-readable medium, the non-transitory computer-readable medium comprising processor-executable instructions configured to cause the processor to:

receive a request from a first subscriber for a media object from a first content provider;

authorize access to the media object from the first content provider using credentials corresponding to the first subscriber;

request the media object from the first content provider;

instantiate, by a content-provider agent, a virtual screen session that executes a content-provider application or browser using the credentials corresponding to the first subscriber;

render, through the virtual screen session, the media object to decode content-provider-specific encryption and digital rights management protections and to generate rendered frames of the media object that are placed into video memory;

extract the rendered frames from the video memory and generically encode the rendered frames into a provider-independent encoding format that removes content-provider-specific encoding as to generate a first generically encoded media object;

transmit the first generically encoded media object to the first subscriber; and transmit the first generically encoded media object to a second subscriber for storing in cache based on a determination that the second subscriber is likely to order the media object from a second content provider.

2. The system of claim 1, wherein the processor-executable instructions further cause the processor to receive a request from the second subscriber for the media object from the second content provider.

3. The system of claim 2, wherein the processor-executable instructions further cause the processor to authorize access to the media object from the second content provider using credentials corresponding to the second subscriber.

4. The system of claim 3, wherein the processor-executable instructions further cause the processor to request the media object from the second content provider.

5. The system of claim 4, wherein the processor-executable instructions further cause the processor to generically encode the media object to generate a second generically encoded media object by encoding the rendered frames of the media object from video memory.

6. The system of claim 5, wherein the processor-executable instructions further cause the processor to compare the first generically encoded media object to the second generically encoded media object to determine if they are identical media objects.

7. The system of claim 6, wherein the processor-executable instructions further cause the processor to instruct the second subscriber to play the first generically encoded media object from cache responsive to determining that the first generically encoded media object and the second generically encoded media object are identical media objects.

8. The system of claim 6, wherein the processor-executable instructions further cause the processor to transmit the second generically encoded media object to the second subscriber responsive to determining that the first generically encoded media object and the second generically encoded media object are not identical media objects.

9. The system of claim 6, wherein determining that the first generically encoded media object and the second generically encoded media object are identical media objects comprises comparing metadata of the first generically encoded media object to the second generically encoded media object.

10. The system of claim 6, wherein determining that the first generically encoded media object and the second generically encoded media object are identical media objects comprises comparing fingerprints of chunks of each media object.

11. The system of claim 1, wherein the processor-executable instructions further cause the processor to initiate the virtual screen session for rendering the media object from the first content provider.

12. The system of claim 1, wherein the processor-executable instructions further cause the processor to send information regarding interactions of the first subscriber with a website or application of the first content provider.

13. The system of claim 12, wherein the processor-executable instructions further cause the processor to generate an interface that mimics the website or application of the first content provider, the first subscriber interacting with the generated interface.

14. A method for reducing bandwidth consumption comprising:

receiving a request from a first subscriber for a media object from a first content provider;

27 authorizing access to the media object from the first content provider using credentials corresponding to the first subscriber;

requesting the media object from the first content provider;

instantiating, by a content-provider agent, a virtual screen session that executes a content-provider application or browser using the credentials corresponding to the first subscriber;

rendering, through the virtual screen session, the media object to decode content-provider-specific encryption and digital rights management protections and to generate rendered frames of the media object that are placed into video memory;

extracting the rendered frames from the video memory and generically encoding the rendered frames into a provider-independent encoding format that removes content-provider-specific encoding so as to generate a first generically encoded media object;

transmitting the first generically encoded media object to the first subscriber;

transmitting the first generically encoded media object to a second subscriber for storing in cache based on a determination that the second subscriber is likely to order the media object from a second content provider;

receiving a request from the second subscriber for the media object from the second content provider;

authorizing access to the media object from the second content provider using credentials corresponding to the second subscriber;

requesting the media object from the second content provider;

instantiating, by the content-provider agent, a second virtual screen session that executes a content-provider application or browser using the credentials corresponding to the second subscriber;

rendering, through the second virtual screen session, the media object to generate second rendered frames that are placed into video memory;

extracting the second rendered frames from the video memory and generically encoding the second rendered frames into the provider-independent encoding format so as to generate a second generically encoded media object;

comparing the first generically encoded media object to the second generically encoded media object to determine if they are identical media objects;

instructing the second subscriber to play the first generically encoded media object from cache responsive to determining that the first generically encoded media object and the second generically encoded media object are identical media objects; and transmitting the second generically encoded media object to the second subscriber responsive to determining that the first generically encoded media object and the second generically encoded media object are not identical media objects.

15. The method of claim 14, wherein determining that the first generically encoded media object and the second generically encoded media object are identical media objects comprises comparing metadata of the first generically encoded media object to the second generically encoded media object.

16. The method of claim 14, wherein determining that the first generically encoded media object and the second generically encoded media object are identical media objects comprises comparing fingerprints of chunks of each media object.

17. The method of claim 14 further comprising initiating the virtual screen session for rendering the media object from the first content provider.

18. The method of claim 14 further comprising sending information regarding interactions of the first subscriber with a website or application of the first content provider.

19. The method of claim 18 further comprising generating an interface that mimics the website or application of the first content provider, the first subscriber interacting with the generated interface.

20. The method of claim 14 further comprising identifying chunks of the second generically encoded media object that do not have a sufficiently similar fingerprint to the first generically encoded media object and storing the identified chunks as an advertisement in a cache.

21. The method of claim 14, wherein the media object is received from the first content provider in a first encoding and from the second content provider in a second encoding different from the first encoding.

* * * * *